United States Patent
Sugiura et al.

(10) Patent No.: US 7,413,821 B2
(45) Date of Patent: *Aug. 19, 2008

(54) SOLID POLYMER ELECTROLYTE FUEL CELL ASSEMBLY WITH GAS PASSAGES IN SERIAL COMMUNICATION, AND METHOD OF SUPPLYING REACTION GAS IN FUEL CELL

(75) Inventors: Seiji Sugiura, Utsunomiya (JP);
Yoshinori Wariishi, Utsunomiya (JP);
Narutoshi Sugita, Utsunomiya (JP);
Naoyuki Enjoji, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 750 days.

This patent is subject to a terminal disclaimer.

(21) Appl. No.: 10/471,335

(22) PCT Filed: Mar. 5, 2002

(86) PCT No.: PCT/JP02/02012

§ 371 (c)(1),
(2), (4) Date: Mar. 3, 2004

(87) PCT Pub. No.: WO02/071526

PCT Pub. Date: Sep. 12, 2002

(65) Prior Publication Data

US 2004/0137298 A1 Jul. 15, 2004

(30) Foreign Application Priority Data

Mar. 6, 2001 (JP) ............................... 2001-061516

(51) Int. Cl.
*H01M 8/04* (2006.01)
*H01M 8/10* (2006.01)

(52) U.S. Cl. .............................. 429/13; 429/26; 429/32; 429/38

(58) Field of Classification Search .................... 429/13, 429/26, 30, 32, 38, 39
See application file for complete search history.

(56) References Cited

U.S. PATENT DOCUMENTS 4,324,844 A 4/1982 Kothmann .................... 429/26

(Continued)

FOREIGN PATENT DOCUMENTS

DE 19732305 A1 1/1999

OTHER PUBLICATIONS

English translation of Horiuchi et al. (JP 11-007971), doc date Jan. 1999.*

(Continued)

*Primary Examiner*—Stephen J. Kalafut
(74) *Attorney, Agent, or Firm*—Lahive & Cockfield, LLP; Anthony A. Laurentano, Esq.

(57) ABSTRACT

A cell assembly includes a first unit cell and a second unit cell which are stacked to each other. The first unit cell has a first unified body, and the second unit cell has a second unified body. A plurality of oxidizing gas passages and a plurality of fuel gas passages are provided in the cell assembly. The oxidizing gas passages in the first unit cell and the oxidizing gas passages in the second unit cell are communicated in series to each other. The fuel gas passages in the first unit cell and the fuel gas passages in the second unit cell are communicated in series to each other.

36 Claims, 37 Drawing Sheets

U.S. PATENT DOCUMENTS

| | | | |
|---|---|---|---|
| 4,574,112 A | 3/1986 | Breault et al. | 429/26 |
| RE36,148 E * | 3/1999 | Strasser | 429/13 |
| 6,083,636 A | 7/2000 | Hsu | 429/13 |
| 6,248,466 B1 * | 6/2001 | Takahashi et al. | 429/38 |
| 6,277,511 B1 * | 8/2001 | Iwase et al. | 429/32 |
| 6,322,915 B1 * | 11/2001 | Collins et al. | 429/13 |
| 6,534,209 B1 | 3/2003 | Hauer et al. | |
| 6,572,995 B2 * | 6/2003 | Yang et al. | 429/26 |
| 6,858,338 B2 * | 2/2005 | Sugiura et al. | 429/32 |

OTHER PUBLICATIONS

European Search Report for Application No. 02 701 724.3-2119, dated Aug. 9, 2006.

* cited by examiner

US 7,413,821 B2

SOLID POLYMER ELECTROLYTE FUEL CELL ASSEMBLY WITH GAS PASSAGES IN SERIAL COMMUNICATION, AND METHOD OF SUPPLYING REACTION GAS IN FUEL CELL

RELATED APPLICATIONS

This application is a 35 U.S.C. 371 national stage filing of International Application No. PCT/JP02/02012, filed 5 Mar. 2002, which claims priority to Japan Patent Application No. 2001-61516 filed on 6 Mar. 2001 in Japan. The contents of the aforementioned applications are hereby incorporated by reference.

TECHNICAL FIELD

The present invention relates to a solid polymer electrolyte fuel cell assembly including a plurality of unit cells integrally stacked to each other, wherein each of the unit cells has a unified body including an anode, a cathode and a solid polymer electrolyte membrane between the anode and the cathode. Further, the present invention relates to a fuel cell stack including a stack of the solid polymer electrolyte fuel cell assemblies, and a method of supplying a reaction gas to a fuel cell.

BACKGROUND OF THE INVENTION

In general, a solid polymer electrolyte fuel cell (PEFC) includes a unit cell (unit power generation cell) configured by oppositely disposing an anode and a cathode, each of which is mainly made from carbon, on both sides of an electrolyte membrane of a polymer ion exchange membrane (cation exchange membrane), to form a unified body (membrane-electrode assembly), and holding the unified body between separators (bipolar plates). The solid polymer electrolyte fuel cell is generally used as a fuel cell stack having a specific number of the unit cells.

In the fuel cell of this type, when a fuel gas, for example, a gas mainly containing hydrogen (hereinafter, referred to as "hydrogen containing gas") is supplied to the anode, hydrogen in the hydrogen containing gas is ionized on the catalyst electrode and is migrated to the cathode side via the electrolyte; and electrons generated by such electrochemical reaction are taken to an external circuit, to be used as electric energy in the form of a direct current. In this case, since an oxidizing gas, for example, a gas mainly containing oxygen or air (hereinafter, referred to as "oxygen containing gas") is supplied to the cathode, hydrogen ions, electrons and oxygen react with each other to produce water on the cathode.

When a fuel cell stack is used as an on-vehicle power source, a relatively large output is required for the fuel cell stack. To meet such a requirement, a cell structure for making a size of a reaction plate (power generation plane) of a unit cell larger, and a cell structure for stacking a large number of unit cells to each other have been adopted.

The former cell structure, however, has a problem that the enlarged size of each unit cell leads to the enlargement of the whole size of the fuel cell stack and such a large-sized fuel cell stack is unsuitable as an on-vehicle power source. Accordingly, to obtain a relatively large output, the latter structure for stacking a large number of relatively compact unit cells to each other has been generally adopted. However, as the number of the stacked unit cells becomes larger, the temperature distribution tends to be generated in the stacking direction and also the drainage characteristic of water produced by the electrochemical reaction is degraded, thereby failing to ensure a desired power generation performance.

To solve the above-described problems, the present invention has been made, and an object of the present invention is to provide a solid polymer electrolyte fuel cell assembly capable of effectively improving the power generation performance of each unit cell and reducing the size of the cell assembly with a simple structure, and a fuel cell stack composed of a stack of the cell assemblies.

Another object of the present invention is to provide a method of supplying a reaction gas in a fuel cell, which allows effective power generation of each unit cell and also allows improvement of the drainage characteristic of produced water.

SUMMARY OF INVENTION

According to the present invention, there is provided a solid polymer electrolyte fuel cell assembly composed of a plurality of unit cells integrally stacked to each other, each of the unit cells having a unified body formed by holding a solid polymer electrolyte membrane between an anode and a cathode, characterized in that reaction gas passages for allowing at least one of reaction gases composed of a fuel gas and an oxidizing gas to flow in the plurality of unit cells are provided in the cell assembly in such a manner that at least portions of the reaction gas passages are communicated in series to each other over the unit cells. Here, the wording "at least portions" means at least two or more of the plurality of the reaction gas passages, and also means at least parts of the reaction gas passages.

With this configuration, in the cell assembly, a reaction gas in an amount required for cell reaction in the unit cell on the upstream side and the unit cell on the downstream side is supplied to the unit cell on the upstream side, so that the flow rate of the reaction gas supplied in the cell assembly is increased, with a result that it is possible to equalize humidities in the unit cells, and also to equalize current density distributions in a plurality of the unit cells and hence to reduce a concentration over potential. Further, water produced in the unit cells can be effectively discharged only by increasing the flow velocity of the reaction gas supplied to the cell assembly, and thereby the drainage characteristic of the whole cell assembly can be improved.

Since the reaction gas passages extend longer to connect a plurality of the unit cells to each other, a pressure drop is increased, so that it is possible to effectively improve the distribution characteristic of the reaction gas between respective unit cells and the drainage characteristic of produced water. Further, since the cell assembly is a one-body composed of a plurality of unit cells, the fuel cell stack can be assembled by stacking the cell assemblies to each other. As a result, it is possible to effectively simplify the workability of assembly of the fuel cell stack as compared with the assembly of the fuel cell stack by stacking unit cells to each other.

In the cell assembly, at least two of the unit cells may have structures different from each other. With this configuration, the structure most suitable for cell reaction can be adopted for each unit cell. In this case, those, provided in the at least two of the unit cells, of the reaction gas passages for allowing at least one of a fuel gas and an oxidizing gas to flow therethrough, have cross-sections different from each other. With this configuration, even if the amount of the reaction gas is reduced due to the electrochemical reaction, the reactions on the reaction planes in the unit cells can be equalized.

Concretely, the cross-sections of the reaction gas passages provided in the at least two of the unit cells may be made different from each other by making the reaction gas passages different from each other in terms of at least one of a passage depth, a passage width, and the number of passages. With this configuration, if the passage depth is made small, each unit cell can be thinned, so that the whole cell assembly can be miniaturized. If the passage width is made smaller or the number of passages is reduced, the contact area between respective unit cells can be increased and thereby the, contact resistance can be reduced.

The cross-section of the reaction gas passage provided in each of those, on the downstream side in the flow direction of the reaction gas, of the at least two of the unit cells may be smaller than the cross-section of the reaction gas passage provided in each of those, on the upstream side in the flow direction of the reaction gas, of the at least two of the unit cells. Although the amount of produced water is increased on the downstream side in the flow direction of the reaction gas, since the flow velocity of the reaction gas on the downstream side is increased by reducing the passage cross-section, it is possible to effectively improve the drainage characteristic of the produced water on the downstream side.

The length of the reaction gas passage provided in each of those, on the downstream side in the flow direction of the reaction gas, of the at least two of the unit cells may be greater than the length of the reaction gas passage provided in each of those, on the upstream side in the flow direction of the reaction gas, of the at least two of the unit cells. With this configuration, there occurs a pressure drop of the reaction gas on the downstream side in the flow direction of the reaction gas, so that it is possible to improve the drainage characteristic of produced water.

Further those, provided in the at least two of the unit cells, of the reaction gas passages may have shapes different from each other. For example, by forming the reaction gas passage on the upstream side in the flow direction into a linear shape and forming the reaction gas passage on the downstream side in the flow direction into a meandering shape, it is possible to change the length of the reaction gas passages with a simple configuration.

Further those, provided in the at least two of the unit cells, of the unified bodies may be different from each other. For example, the heat resistance of the unified body provided in each of those, on the downstream side in the flow direction of the reaction gas, of the at least two of the unit cells may be higher than the heat resistance of the unified body provided in each of those, on the upstream side in the flow direction of the reaction gas, of the at least two of the unit cells. This is because the temperature of the unified body on the downstream side in the flow direction becomes higher than the temperature of the unified body on the upstream side in the flow direction. Preferably, the unified body provided in each of those, on the upstream side in the flow direction of the reaction gas, of the at least two of the unit cells is provided with a fluorine based membrane; and the unified body provided in each of those, on the downstream side in the flow direction of the reaction gas, of the at least two of the unit cells is provided with a hydrocarbon based membrane. Since the unified body on the downstream side in the flow direction, which is higher in temperature than the unified body on the upstream side in the flow direction, is made from a hydrocarbon based membrane having a high heat resistance, the useful life of the unified body on the downstream side can be prolonged.

Preferably, each separator is interposed between adjacent two of the unified bodies; and the separator has, on its plane, a reaction gas supply communication hole for supplying the reaction gas into the reaction gas passage provided in each of the unit cells and a reaction gas discharge communication hole for discharging the reaction gas from the reaction gas passage provided in each of the unit cells. With this configuration, it is possible to improve the drainage characteristic of produced water, and to eliminate the need of provision of a special seal mechanism which is required in the case of providing a separate manifold outside the cell assembly.

Preferably, each separator is interposed between adjacent two of the unified bodies; and the separator is configured as a metal plate having a shape of projections and depressions corresponding to the shape of the reaction gas passage. With this configuration, the separator can be formed of a corrugated metal sheet, and thereby the separator can be thinned.

Preferably, the separator has, on the side facing to one of the unified bodies, a fuel gas passage functioning as the reaction gas passage, and also has, on the side facing to the other of the unified bodies, an oxidizing gas passage functioning as the reaction gas passage. With this configuration, the separator structure can be easily thinned as compared with a separator structure in which the fuel gas passage and an oxidizing gas passage are individually provided on two separators. As a result, it is possible to miniaturize the whole cell assembly.

Preferably, the reaction gas passage is set such that the reaction gas passes through a reaction plane of one of the adjacent two of the unit cells, flows in the stacking direction of the unit cells, and flows on a reaction plane of the other of the adjacent one of the unit cells. Concretely, the reaction gas passage may be set to meanderingly extend toward a communication hole opened in the stacking direction of the unit cells. With these configurations, it is possible to reduce the length of the passages for communicating the unit cells to each other, and also to easily form a temperature gradient most suitable for increasing the power generation performance along the flow direction of the reaction gas.

The flow direction of a fuel gas passage as the reaction gas passage along the reaction plane of the unit cell may be opposite to the flow direction of an oxidizing gas passage as the reaction gas passage along the reaction plane of the unit cell. With this configuration, it is possible to effectively humidify the anode by water produced on the cathode.

Preferably, fuel gas passages as the reaction gas passages are provided in series in the plurality of unit cells; and oxidizing gas passages as the reaction gas passages are provided in parallel in the plurality of unit cells. With this configuration, it is possible to give a sufficient pressure drop to the fuel gas passage having a low viscosity, and hence to effectively discharge water from the anode side.

Each of a fuel gas passage and an oxidizing gas passage as the reaction gas passages may be provided in such a manner as to linearly extend along the reaction plane of the unit cell. With this configuration, since the gas passage has no bent portion, it is possible to ensure a desirable drainage characteristic, and to easily produce a passage member (separator) from a metal sheet by press-working.

At least one of a fuel gas passage and an oxidizing gas passage as the reaction gas passages may be provided with a reaction gas inlet and a reaction gas outlet on one side of the unit cell in the plane direction. With this configuration, a so-called inner manifold is disposed in the cell assembly, so that the whole cell assembly can be miniaturized.

Preferably, an intermediate communication hole communicated to the reaction gas-passage is provided for each of the unit cells in such a manner as to extend in the stacking direction of the unit cells; and the reaction gas passages form an approximately U-shaped flow line extending from one reaction gas inlet of one of the adjacent two of the unit cells to a reaction gas outlet of the other of the adjacent two of the unit cells through the intermediate communication holes. With this configuration, it is possible to reduce the length of the passages communicating the unit cells to each other, and also to easily form a temperature gradient most suitable for increasing the power generation performance along the flow direction of the reaction gas.

Preferably, coolant passages may be provided with the plurality of the unit cells put therebetween while being located on both sides of the unit cells in the stacking direction of the unit cells. With this configuration, it is possible to simplify the cooling structure and hence to easily reduce the size and weight of the whole cell assembly. In particular, the coolant passages may be closer to an oxidizing gas passage provided in the unit cell on the upstream side in the flow direction of the oxidizing gas as compared with an oxidizing gas passage provided in the unit cell on the downstream side in the flow direction of the oxidizing gas. With this configuration, it is possible to increase the temperature of the unit cell on the downstream side where a large amount of water tends to accumulate, and hence to reduce a relative humidity in a region from the oxidizing gas inlet to the cathode side outlet.

Preferably, coolant inlets and coolant outlets communicated to the coolant passages are provided on one side of the unit cells in the plane direction of the unit cells. With this configuration, since an internal manifold is formed in the cell assembly, it is possible to miniaturize the whole cell assembly. Further, the coolant passages may be configured to form an approximately U-shaped flow line for allowing the coolant to flow from the coolant inlet to one side of a partition wall member, flow along the one side of the partition wall member, flow to the other side of the partition wall member via an intermediate return portion, and flow in the opposite direction along the other side of the partition wall member. With this configuration, it is possible to reduce the length of the passages for communicating the unit cells to each other, and also to easily form a temperature gradient most suitable for increasing the power generation performance along the flow direction of the reaction gas.

The coolant passage may be provided, in such a manner as to linearly extend along the plane direction of the unit cell. With this configuration, since the gas passage has no bent portion, it is possible to ensure a desirable drainage characteristic, and to easily produce a passage member from a metal sheet by press-working.

According to the present invention, there is provided a solid polymer electrolyte fuel cell assembly compose of a plurality of unit cells integrally stacked to each other, each of the unit cells having a unified body formed by holding a solid polymer electrolyte membrane between an anode and a cathode, characterized in that coolant passages communicated to each other in series are provided with the plurality of unit cells put therebetween while being located on both sides of the unit cells in the stacking direction of the unit cells. With this configuration, it is possible to give both an optimum temperature distribution and an optimum humidity distribution to the unit cells stacked to each other.

According to the present invention, there is provided a fuel cell stack composed of a stack of a plurality of cell assemblies, characterized in that each of the plurality of cell assemblies is composed of a plurality of unit cells integrally stacked to each other, each of the unit cells having a unified body formed by holding a solid polymer electrolyte membrane between an anode and a cathode; and reaction gas passages for allowing at least one of reaction gases composed of a fuel gas and an oxidizing gas to flow in the plurality of unit cells are provided in the cell assembly in such a manner that at least portions of the reaction gas passages are communicated in series to each other over the unit cells.

With this configuration, in each cell assembly, a reaction gas in an amount required for cell reaction in the unit cell on the upstream side in the flow direction and the unit cell on the downstream side in the flow direction is supplied to the unit cell on the upstream side, so that the flow rate of the reaction gas supplied in the cell assembly is increased, with a result that it is possible to equalize humidities in the cell assemblies, and also to equalize current density distributions in the whole fuel cell stack and hence to reduce a concentration overpotential.

In each cell assembly, at least two of the unit cells may have structures different from each other. With this configuration, it is possible to adopt the structure most suitable for reaction in each unit cell. Further, a coolant passage may be provided only between adjacent two of the cell assemblies. With this configuration, it is possible to simplify the coolant passages and hence to easily miniaturize the whole fuel dell stack.

Preferably, a reaction gas supply communication hole and a reaction gas discharge communication hole, which are opened in the stacking direction of the fuel cell stack, are provided; and intermediate communication holes opened in the stacking direction of the fuel cell stack are provided in a flow line between the reaction gas supply communication hole and the reaction gas discharge communication hole. With this configuration, it is possible to reduce the length of the passages for communicating the unit cells to each other, and also to easily form a temperature gradient most suitable for increasing the power generation performance along the flow direction of the reaction gas.

Each of the intermediate communication holes may be provided in a flow line between a reaction gas inlet provided in a plane of one of adjacent two of the unit cells and a reaction gas outlet provided in a plane of the other of the adjacent two of the unit cells. The intermediate communication hole may be provided for communicating adjacent two of the unit cells provided in adjacent two of the cell assemblies to each other. The intermediate communication hole may be provided for communicating adjacent two of the unit cells only in one of the cell assemblies to each other. With these configurations, since the intermediate communication holes are integrally communicated to each other, it is possible to equalize the concentrations of the reaction gas in the stacking direction of the unit cells.

According to the present invention, there is provided a fuel cell stack composed of a stack of a plurality of cell assemblies, characterized in that each of the plurality of cell assemblies is composed of a plurality of unit cells integrally stacked to each other, each of the unit cells having a unified body formed by holding a solid polymer electrolyte membrane between an anode and a cathode; and coolant passages communicated to each other in series are provided with the plurality of unit cells put therebetween while being located on both sides of the unit cells in the stacking direction of the unit cells. With this configuration, it is possible to give an optimum temperature distribution and an optimum humidity distribution to each of the unit cells stacked to each other.

According to the present invention, there is provided a method of supplying a reaction gas to a solid polymer electrolyte fuel cell assembly composed of a plurality of unit cells integrally stacked to each other, each of the unit cells having a unified body formed by holding a solid polymer electrolyte membrane between an anode and a cathode, wherein reaction gas passages for allowing at least one of reaction gases composed of a fuel gas and an oxidizing gas to flow in the plurality of unit cells are provided in the cell assembly in such a manner that at least portions of the reaction gas passages are communicated in series to each other over the unit cells, the method being characterized by supplying the reaction gas from a reaction gas supply communication hole to a plurality of reaction gas passages in the unit cells in parallel, to subject the reaction gas flowing in the reaction gas passages to cell reaction; and discharging the spent reaction gas to reaction gas discharge communication holes. With this configuration, it is possible to increase the flow rate, flow velocity, and pressure drop of the reaction gas, and hence to effectively improve the reaction performance of each unit cell.

Preferably, the reaction gas is introduced in the unit cell on the upstream side in the flow direction of the reaction gas to be used for cell reaction, and is then introduced, via an intermediate communication hole, in the unit cell on the downstream side in the flow direction of the reaction gas to be used for cell reaction. At this time, the reaction gas in an amount required for reaction in the whole of the cell assembly may be introduced in the unit cell on the most upstream side in the flow direction of the reaction gas.

Preferably, the reaction gas is an oxidizing gas; and a coolant is supplied in coolant passages which are closer to an oxidizing gas passage provided in the unit cell on the upstream side in the flow direction of the oxidizing gas as compared with an oxidizing gas passage provided in the unit cell on the downstream side in the flow direction of the oxidizing gas. With this configuration, it is possible to reduce a relative humidity in a region from the oxidizing gas inlet to the cathode side outlet by increasing the temperature of the unit cell on the downstream side in the flow direction in which a great amount of water tends to accumulate.

The above and other objects, features, and advantages of the present invention will become more apparent from the following description when taken in conjunction with the accompanying drawings in which preferred embodiments of the present invention are shown by way of illustrative example.

DESCRIPTION OF ILLUSTRATED EMBODIMENTS

Figure 1:
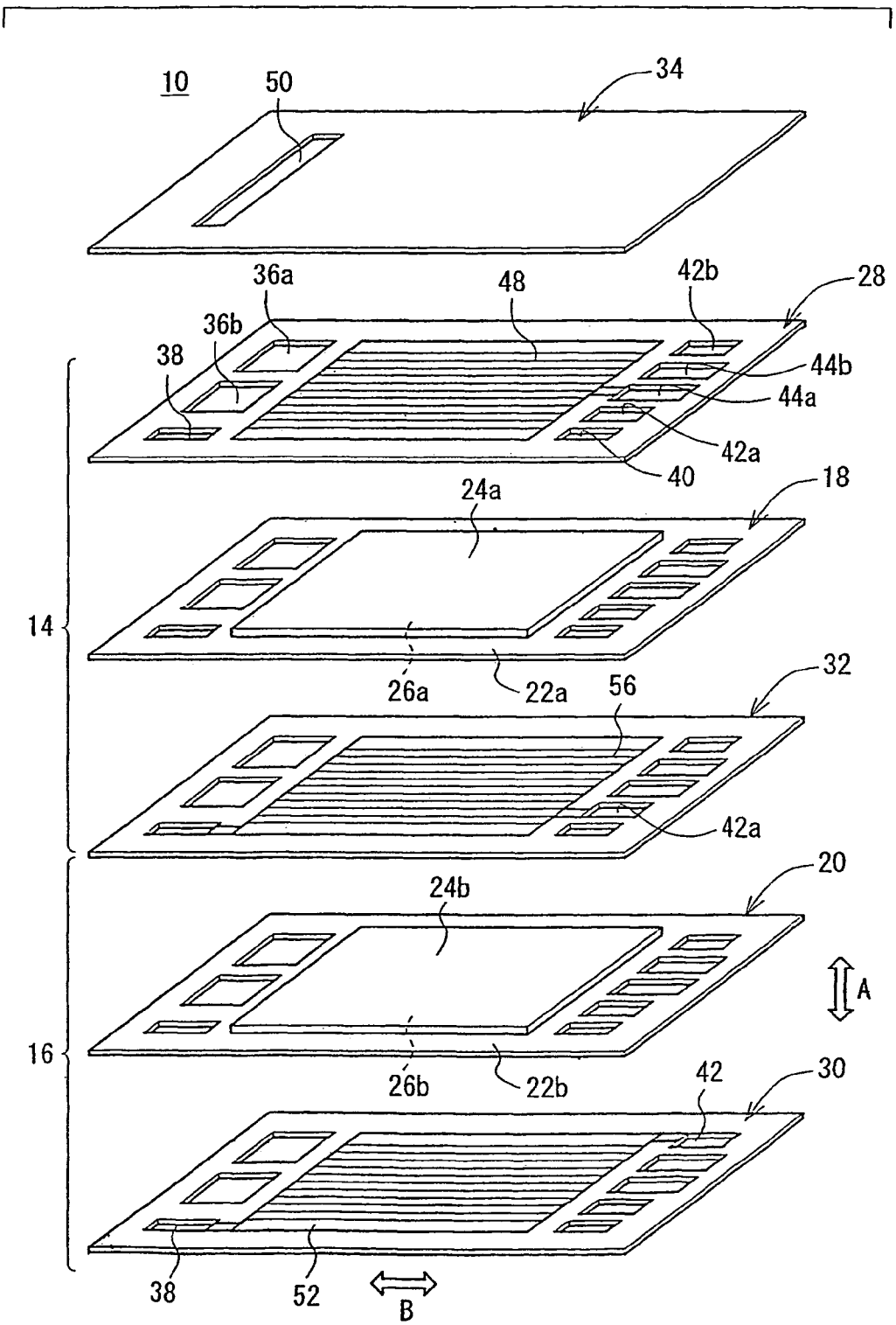
FIG. 1 is an exploded perspective view of an essential portion of a solid polymer electrolyte fuel cell assembly according to a first embodiment of the present invention.
Figure 2:
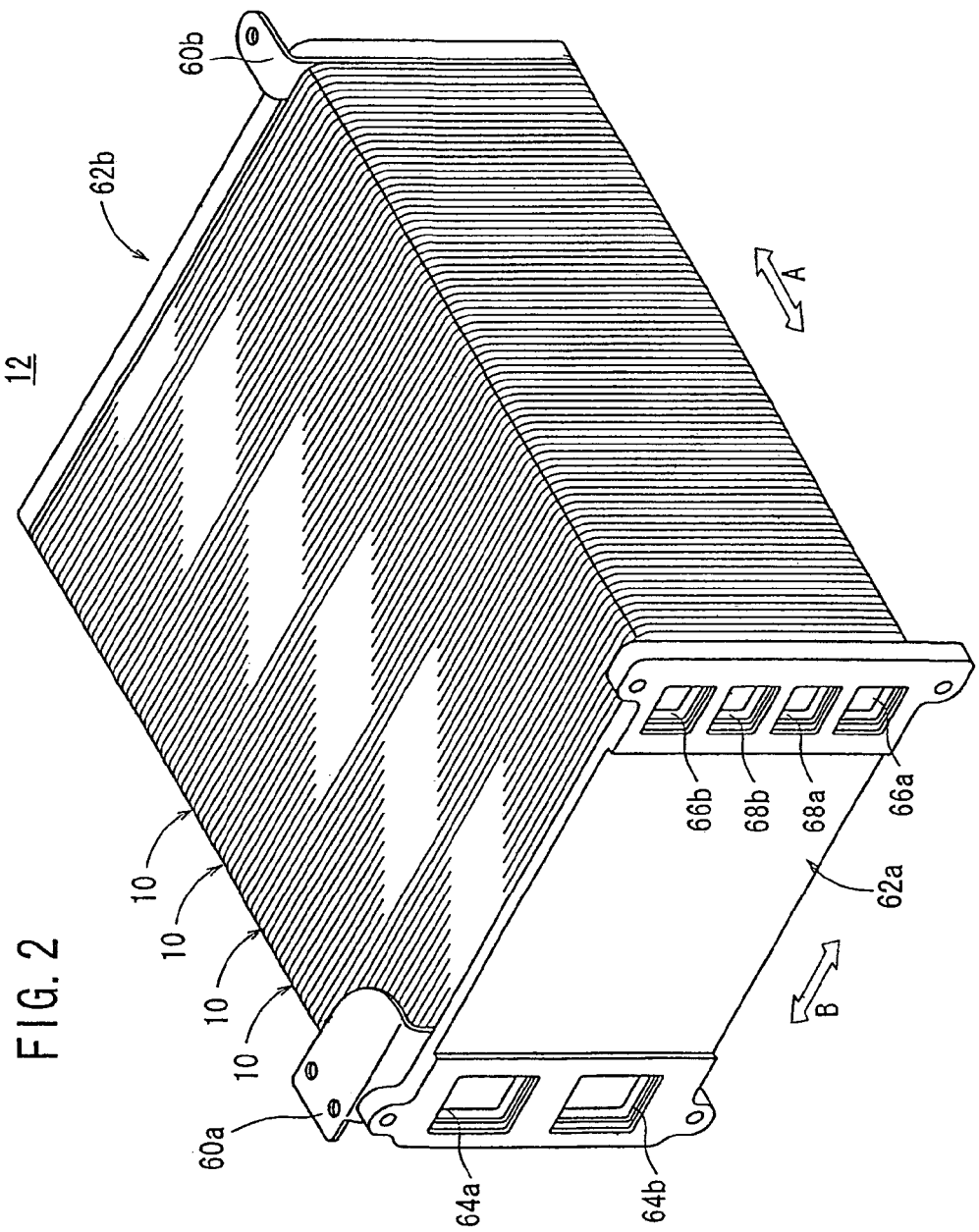
FIG. 2 is a schematic perspective view of a fuel cell stack.

FIG. 1 is an exploded perspective view of an essential portion of a solid polymer electrolyte fuel cell assembly 10 according to a first embodiment of the present invention, and FIG. 2 is a schematic perspective view of a fuel cell stack 12 obtained by stacking a plurality of sets of the cell assemblies 10 to each other.

As shown in FIG. 1, the cell assembly 10 includes a first unit cell 14 and a second unit cell 16 which are stacked to each other. The first unit cell 14 has a first unified body (so-called, "membrane-electrode assembly") 18, and the second unit cell 16 has a second unified body 20.

The first unified body 18 has a solid polymer electrolyte membrane 22a, and a cathode 24a and an anode 26a which are disposed with the electrolyte membrane 22a put therebetween, and the second unified body 20 has a solid polymer electrolyte membrane 22b, and a cathode 24b and an anode 26b which are disposed with the electrolyte membrane 22b put therebetween. Each of the cathodes 24a and 24b and the anodes 26a and 26b is formed by joining a noble metal based catalyst electrode layer on a base member mainly made from carbon and is provided, on its surface, with a gas diffusion layer formed of a porous layer, for example, a porous carbon paper.

Figure 3:
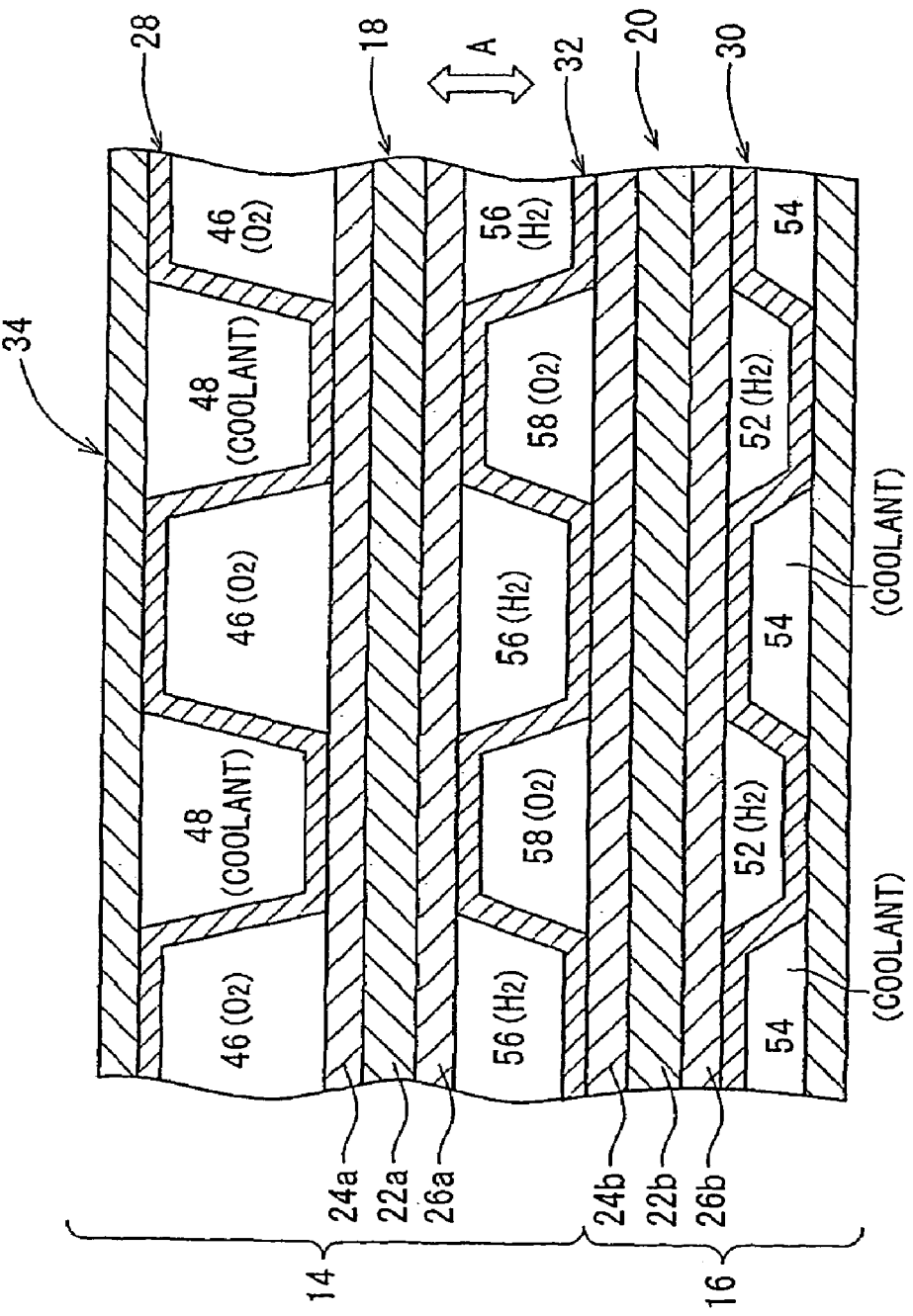
FIG. 3 is an illustrative view of the cell assembly, with parts partially cutaway.

As shown in FIGS. 1 and 3, a first separator 28 is disposed on the cathode 24a side of the first unified body 18; a second separator 30 is disposed on the anode 26b side of the second unified body 20; and an intermediate separator 32 is disposed between the first and second unified bodies 18 and 20. A thin wall plate (partition wall member) 34 is provided on each of both outer surface sides of the first and second separators 28 and 30.

As shown in FIG. 1, each of the first and second unified bodies 18 and 20, the first and second separators 28 and 30, and the intermediate separator 32 has, at its one edge portion in the long-side direction, an oxidizing gas inlet 36a, an oxidizing gas outlet 36b, and a fuel gas intermediate communication hole 38. The oxidizing gas inlet 36a, which is also called a reaction gas supplying communication hole and the oxidizing gas outlet 36b, which is also called a reaction gas discharging communication hole, are adapted to allow an oxidizing gas (reaction gas) such as an oxygen containing gas or air to pass through; and the fuel gas intermediate communication hole 38 is adapted to allow a fuel gas (reaction gas) such as a hydrogen containing gas to pass therethrough. These oxidizing gas inlets 36a (oxidizing gas outlets 36b, fuel gas intermediate communication holes 38) formed in respective cell components 18, 20, 28, 30, and 32 are communicated to each other in the stacking direction (shown by an arrow A) of the first and second unit cells 14 and 16.

On the other hand, each of the first and second unified bodies 18 and 20, the first and second separators 28 and 30, and the intermediate separator 32 has, at its the other edge portion in the long-side direction, an oxidizing gas intermediate communication hole 40, a fuel gas inlet 42a, a fuel gas outlet 42b, a coolant inlet 44a, and a coolant outlet 44b. The oxidizing gas intermediate communication hole 40 is adapted to allow an oxidizing gas to pass therethrough; the fuel gas inlet 42a, which is also called a reaction gas supplying communication hole, and the fuel gas outlet 42b, which is also called a reaction gas discharging communication hole, are adapted to allow a fuel gas to pass therethrough; and the coolant inlet 44a and the coolant outlet 44b are adapted to allow a coolant to pass therethrough. These oxidizing gas intermediate communication holes 40 (fuel gas inlets 42a, fuel gas outlets 42b, coolant inlets 44a, coolant outlets 44b) formed in respective cell components 18, 20, 28, 30, and 32 are communicated to each other in the direction shown by the arrow A.

Figure 4:
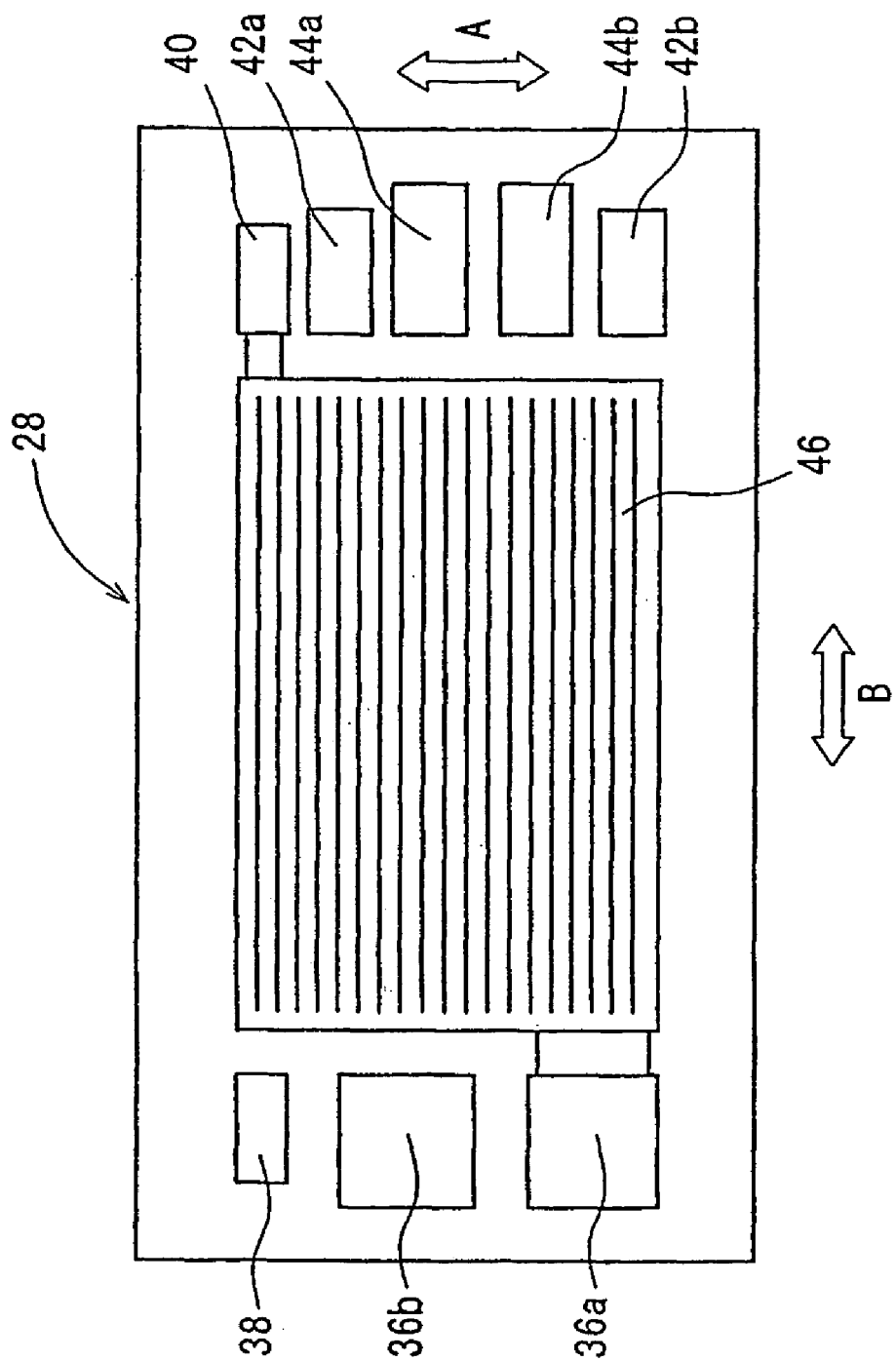
FIG. 4 is a front view of a first separator of the cell assembly.

The first separator 28 is configured as a metal sheet. A portion, facing to a reaction plane (power generation plane) of the first unified body 18, of the metal sheet is formed into a shape of projections and depressions, for example, into a corrugated shape. To be more specific, as shown in FIGS. 3 and 4, the first separator 28 has, on the side facing to the cathode 24a of the first unified body 18, a plurality of oxidizing gas passages (reaction gas passages) 46 provided by forming, as described above, the side facing to the cathode 24a, of the first separator 28 into a corrugated shape. The oxidizing gas passages 46 linearly extend in the long-side direction (shown by an arrow B). The one-ends of the oxidizing gas passages 46 are communicated to the oxidizing gas inlet 36a and the other ends thereof are communicated to the oxidizing gas intermediate communication hole 40.

As shown in FIGS. 1 and 3, the first separator 28 also has, on the side facing to one surface of the wall plate 34, a plurality of coolant passages 48. The coolant passages 48 linearly extend in the long-side direction (shown by the arrow B). The one-ends of the coolant passages 48 are communicated to the coolant inlet 44a, and the other ends thereof are communicated to the coolant outlet 44b by way of the other surface side of the wall plate 34 through a hole portion 50 as an intermediate return portion formed in the wall plate 34 or in a separate member.

The second separator 30 has a configuration which is substantially similar to that of the first separator 28. The second separator 30 has, on the side facing to the anode 26b of the second unified body 20, a plurality of fuel gas passages (reaction gas passages) 52. The fuel gas passages 52 linearly extend in the long-side direction (shown by the arrow B). The one-ends of the fuel gas passages 52 are communicated to the fuel gas intermediate communication hole 38 and the other ends thereof are communicated to the fuel gas outlet 42b. The second separator 30 also has, on the side facing to the wall plate 34 of the next cell assembly 10, a plurality of coolant passages 54. The coolant passages 54 linearly extend in the long-side direction (shown by the arrow B), with their terminals communicated to the coolant outlet 44b.

The intermediate separator 32 has a configuration which is substantially similar to that of each of the first and second separators 28 and 30. The intermediate separator 32 has, on the side facing to the anode 26a of the first unified body 18, a plurality of fuel gas passages (reaction gas passages) 56. The fuel gas passages 56 linearly extend in the long-side direction (shown by the arrow B). The one-ends of the fuel gas passages 56 are communicated to the fuel gas inlet 42a and the other ends thereof are communicated the fuel gas intermediate communication hole 38.

As shown in FIG. 3, the intermediate separator 32 also has, on the side facing to the cathode 24b of the second unified body 20, a plurality of oxidizing gas passages (reaction gas passages) 58. The oxidizing gas passages 58 linearly extend in the long-side direction (shown by the arrow B). The one-ends of the oxidizing gas passages 58 are communicated to the oxidizing gas intermediate communication hole 40 and the other ends thereof are communicated to the oxidizing gas outlet 36b.

The oxidizing gas passage's 46 provided in the first unit cell 14 and the oxidizing gas passages 58 provided in the second unit cell 16, which are communicated in series to each other, are different from each other in passage cross-section; and the fuel gas passages 56 provided in the first unit cell 14 and the fuel gas passages 52 provided in the second unit cell 16, which are communicated in series to each other, are different from each other in passage cross-section. As shown in FIG. 3, the passage cross-section of the oxidizing gas passage 58 on the outlet side is smaller than that of the oxidizing gas passage 46 on the inlet side; and the passage cross-section of the fuel gas passage 52 on the outlet side is smaller than that of the fuel gas passage 56 on the inlet side.

A specific number of sets of the cell assemblies 10 configured as described above are, as shown in FIG. 2, stacked to each other in the direction shown by the arrow A by means of fixing means (not shown). End plates 62a and 62b are disposed, via terminal electrodes 60a and 60b, on both ends of the sets of the cell assemblies 10 in the direction shown by the arrow A, followed by fastening of the end plates 62a and 62b by means of tie rods (not shown) or the like, to obtain a fuel cell stack 12.

The end plate 62a has, at one edge portion in the long-side direction, an oxidizing gas supply port 64a communicated to the oxidizing gas inlets 36a, an oxidizing gas discharge port 64b communicated to the oxidizing gas outlets 36b. The end plate 62a also has, on the other edge portion in the long-side direction, a fuel gas supply port 66a communicated to the fuel gas inlets 42a, a fuel gas discharge port 66b communicated to the fuel gas outlets 42b, a coolant supply port 68a communicated to the coolant inlets 44a, and a coolant discharge port 68b communicated to the coolant outlets 44b.

The operations of the fuel cell stack 12 and the cell assembly 10 configured as described above will be described below.

In the fuel cell stack 12, a fuel gas such as a hydrogen containing gas is supplied from the fuel gas supply port 66a; an oxidizing gas such as air or an oxygen containing gas is supplied from the oxidizing gas supply port 64a; and a coolant such as pure water, ethylene glycol, or oil is supplied from the coolant supply port 68a, so that the fuel gas, oxidizing gas, and coolant are sequentially supplied to the plurality of cell assemblies 10 stacked to each other in the direction shown by the arrow A.

Figure 5:
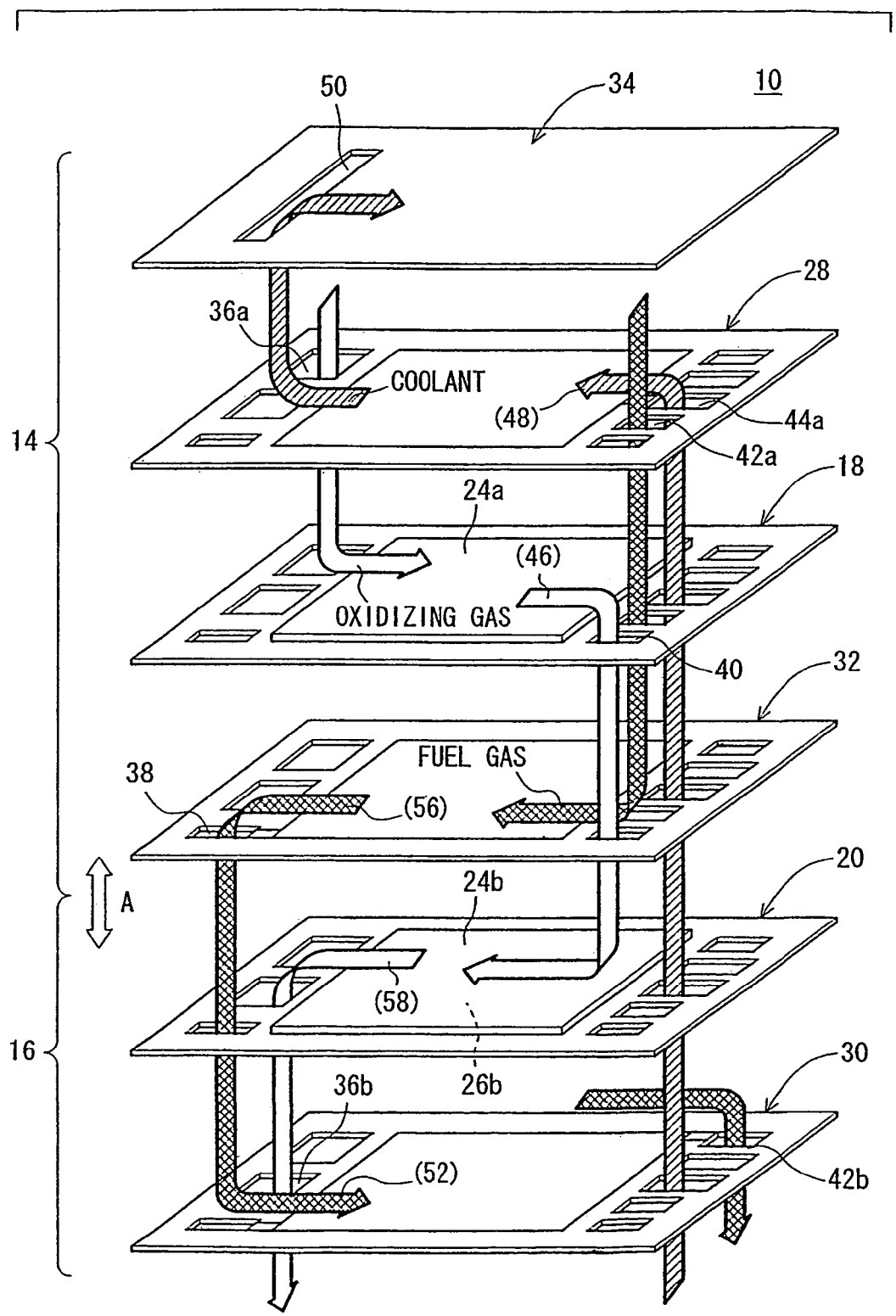
FIG. 5 is a view showing flows of reaction gases and a coolant in the cell assembly.

As shown in FIG. 5, the oxidizing gas supplied to the oxidizing gas inlets 36a communicated to each other in the direction shown by the arrow A is introduced in the plurality of oxidizing gas passages 46 provided in the first separator 28 and is moved along the cathode 24a of the first unified body 18, whereas the fuel gas supplied to the fuel gas inlets 42a communicated to each other in the direction shown by the arrow A is introduced in the plurality of fuel gas passages 56 provided in the intermediate separator 32 and is moved along the anode 26a of the first unified body 18. Accordingly, in the first unified body 18, the oxidizing gas supplied to the cathode 24a and the fuel gas supplied to the anode 26a are consumed by electrochemical reaction in the catalyst layers of the electrodes, to result in power generation.

The oxidizing gas, part of which has been consumed in the first unified body 18, is introduced from the oxidizing gas passages 46 into the oxidizing gas intermediate communication hole 40 of the first unified body 18, being moved in the direction shown by the arrow A through the oxidizing gas intermediate communication hole 40 of the intermediate separator 32, and is introduced in the oxidizing gas passages 58 provided in the intermediate separator 32. The oxidizing gas thus introduced in the oxidizing gas passages 58 is then moved along the cathode 24b of the second unified body 20.

Similarly, the fuel gas, part of which has been consumed in the anode 26a of the first unified body 18, is introduced into the fuel gas intermediate communication hole 38 of the intermediate separator 32, being moved in the direction shown by the arrow A through the fuel gas intermediate communication hole 38 of the second unified body 20, and is introduced in the fuel gas passages 52 provided in the second separator 30. The fuel gas thus introduced in the fuel gas passages 52 is then moved along the anode 26b of the second unified body 20. Accordingly, in the second unified body 20, the oxidizing gas and fuel gas are consumed by electrochemical reaction in the catalyst layers of the electrodes, to result in power generation. The oxidizing gas with its oxygen having been consumed is discharged into the oxygen gas outlet 36b of the second separator 30, and the fuel gas with its hydrogen having been consumed is discharged into the fuel gas outlet 42b of the second separator 30.

On the other hand, the coolant flowing through the coolant inlets 44a communicated to each other in the direction shown by the arrow A reaches the first separator 28. The coolant is then moved along the coolant passages 48 provided in the first separator 28, being returned from the hole portion 50 formed in the wall plate 34 and moved along the coolant passages 54 provided in the second separator 30 of the next cell assembly 10, and is discharged into the coolant outlet 44b of the second separator 30.

According to the first embodiment, the cell assembly 10 is configured as one body of the first and second unit cells 14 and 16, and further, at least part of the oxidizing gas passages 46 provided in the first unit cell 14 are communicated in series to at least part of the oxidizing gas passages 58 provided in the second unit cell 16 via the oxidizing gas intermediate communication holes 40, whereas at least part of the fuel gas passages 56 provided in the first unit cell 14 is communicated in series to at least part of the fuel gas passage 52 provided in the second unit cell 16 via the fuel gas intermediate communication holes 38. Accordingly, the oxidizing gas in an amount of flow required for the whole reaction in the first and second unit cells 14 and 16 is supplied to the oxidizing gas passages 46 on the inlet side, whereas the fuel gas in an amount of flow required for the whole reaction in the first and second unit cells 14 and 16 is supplied to the fuel gas passages 56 on the inlet side. In other words, the oxidizing gas in an amount of flow being twice the amounts of flow generally required for the reaction in the unit cell is supplied to the oxidizing gas passages 46 on the inlet side, whereas the fuel gas in an amount of flow being twice the amount of flow generally required for the reaction in the unit cell is supplied to the fuel gas passages 56 on the inlet side.

As a result, particularly, drainage characteristics of the oxidizing gas passages 46 and 58 in which water is produced are improved, and thereby humidities in the oxidizing gas passages 46 and 58 in the first and second unit cells 14 and 16 are equalized. This is effective to equalize current density distributions in the first and second unit cells 14 and 16 and hence to reduce occurrence of a concentration overpotential.

Since the oxidizing gas passages 46 in the first unit cell 14 are communicated in series to the oxidizing gas passages 58 in the second unit cell 16 and the fuel gas passages 56 in the first unit cell 14 are communicated in series to the fuel gas passages 52 in the second unit cell 16, the flow velocity of the oxidizing gas supplied to the oxidizing gas inlets 36a and also the flow velocity of the fuel gas supplied to the fuel gas inlets 42a become high as compared with the conventional unit cell structure. As a result, it is possible to effectively discharge water produced in the first and second unit cells, and hence to significantly improve the whole drainage characteristic of the cell assembly 10.

Since the oxidizing gas passages 46 in the first unit cell 14 are communicated in series to the oxidizing gas passages 58 in the second unit cell 16, to form a long oxidizing gas (reaction gas) path extending from the first unit cell 14 to the second unit cell 16, whereas the fuel gas passages 56 in the first unit cell 14 are communicated in series to the fuel gas passages 52 in the second unit cell 16, to form a long fuel gas (reaction gas) path extending from the first unit cell 14 to the second unit cell 16, there can be obtained advantages of increasing a pressure drop in the first and second unit cells 14 and 16 thereby effectively improving the drainage characteristics of water produced by the oxidizing gas and fuel gas in the first and second unit cells 14 and 16, and of the equalizing distributions of the oxidizing gas and fuel gas to respective cell assemblies 10 in the fuel cell stack 12.

According to the first embodiment, since the passage cross-section of each oxidizing gas passage 46 is different from that of each oxidizing gas passage 58, whereas the passage cross-section of each fuel gas passage 56 is different from that of each fuel gas passage 52. To be more specific, as shown in FIG. 3, the passage cross-section of the oxidizing gas passage 58 on the outlet side is smaller than that of the oxidizing gas passage 46 on the inlet side, whereas the passage cross-section of the fuel gas passage 52 on the outlet side is smaller than that of the fuel gas passage 56 on the inlet side. Along with movement of each of the oxidizing gas and the fuel gas toward the outlet side, the amount of the gas is reduced by consumption due to cell reaction. From this viewpoint, by making the passage cross-section of each of the oxidizing gas passages 58 and the fuel gas passages 52 on the outlet side smaller, the reactions on the reaction plane of the second unified body 20 can be equalized.

The passage cross-section of each of the oxidizing gas passages 46 can be made different from that of each of the oxidizing gas passages 58 by changing the passage depth, the passage width, or the number of the passages, and similarly, the passage cross-section of each of the fuel gas passages 56 can be made different from that of each of the fuel gas passages 52 by changing the passage depth, the passage width, or the number of the passages as follows.

Figure 6:
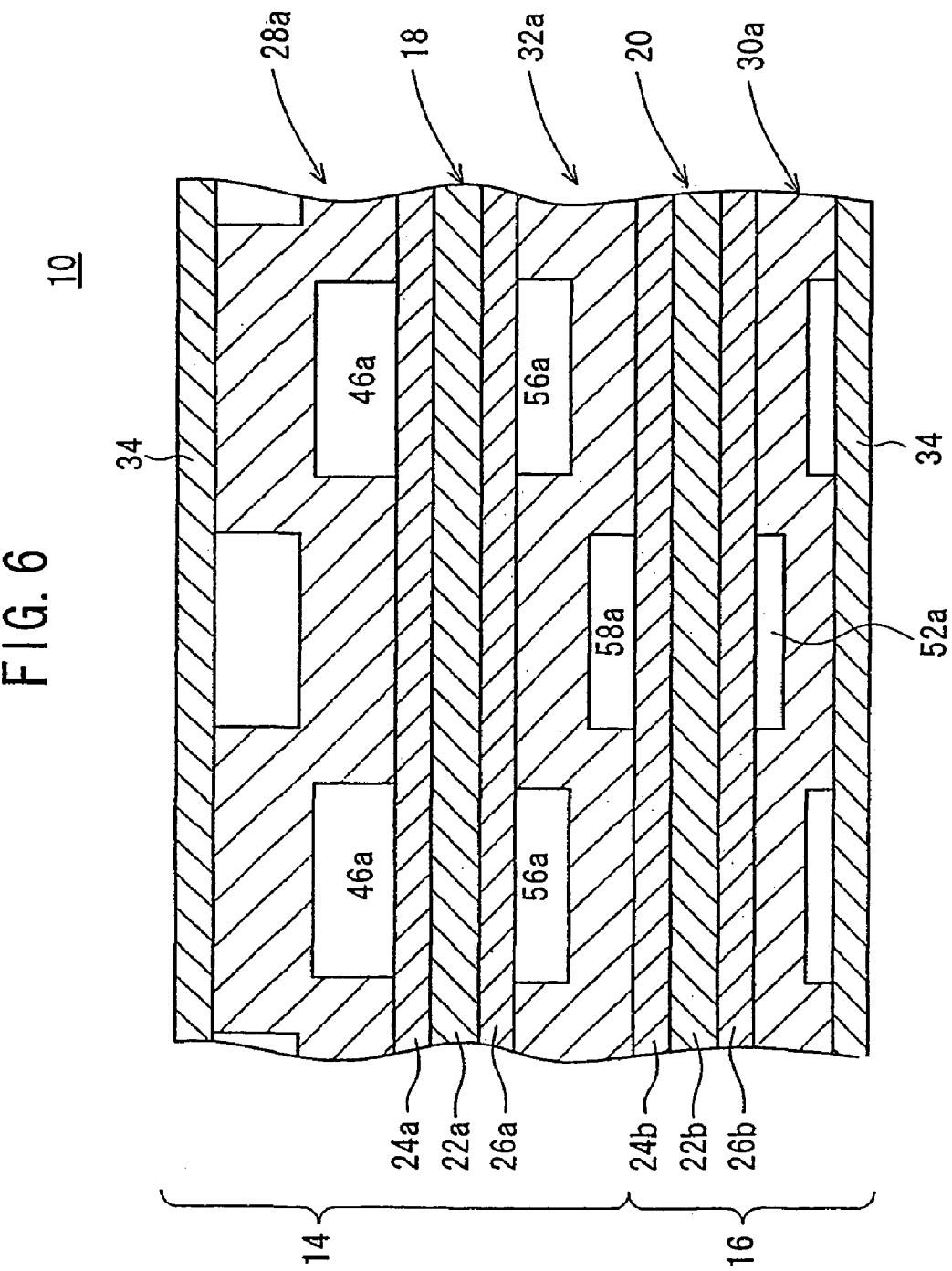
FIG. 6 is a view illustrating a manner of making cross-sections of passages different from each other by making the depths of the passages different from each other.

In an example shown in FIG. 6, the passage depth of each oxidizing gas passage 58a provided in a plate-like intermediate separator 32a is set to be smaller than the passage depth of each oxidizing gas passage 46a provided in a plate-like first separator 28a, whereas the passage depth of each fuel gas passage 52a provided in a plate-like second separator 30a is set to be smaller than the passage depth of each fuel gas passage 56a provided in the plate-like intermediate separator 32a. With this configuration, as the additional effect, each of the first and second unit cells 14 and 16 can be thinned and thereby the whole cell assembly 10 can be easily miniaturized.

Figure 7:
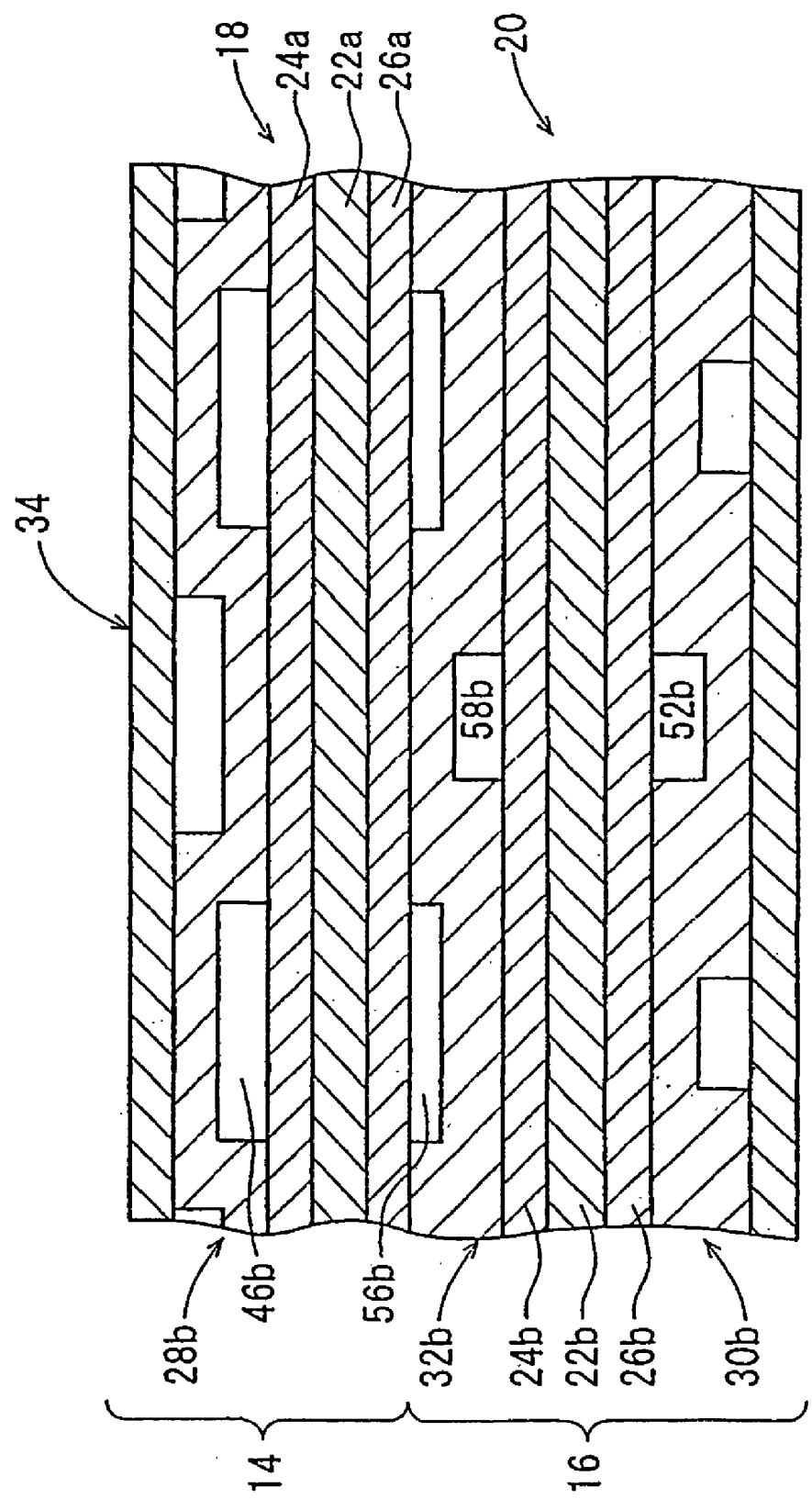
FIG. 7 is a view illustrating a manner of making cross-sections of passages different from each other by making the widths of the passages different from each other.

In an example shown in FIG. 7, the passage width of each outlet side oxidizing gas passage 58b formed in a plate-like intermediate separator 32b is smaller than the passage width of each inlet side oxidizing gas passage 46b formed in a plate-like first separator 28b, and similarly, the passage width of an outlet side fuel gas passage 52b formed in a plate-like second separator 30b is smaller than the passage width of an inlet side fuel gas passage 56b formed in the intermediate separator 32b. With this configuration, as the additional effect, the contact area between the first and second unit cells 14 and 16 is increased, thereby reducing the contact resistance.

Figure 8:
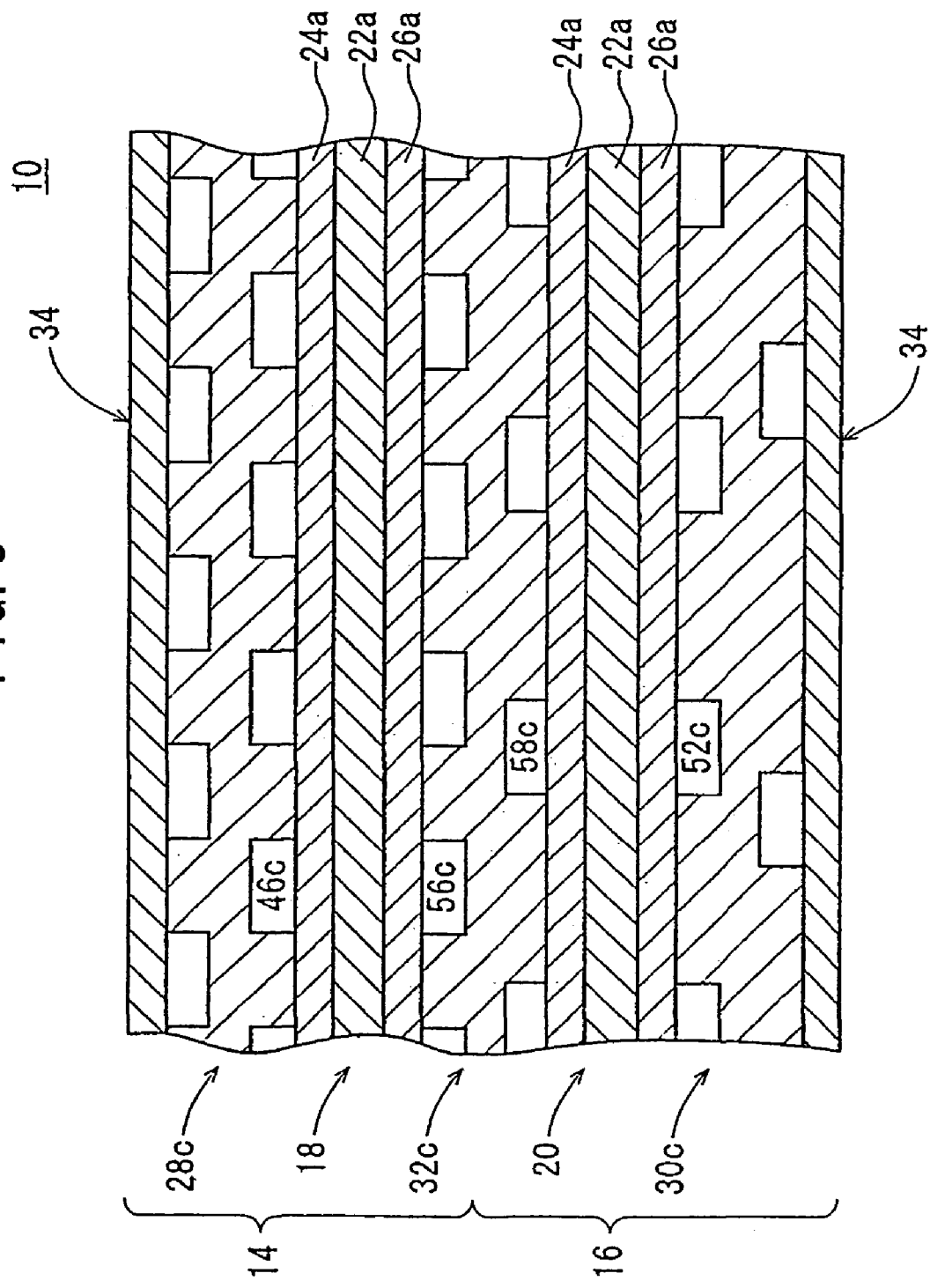
FIG. 8 is a view illustrating a manner of making cross-sections of passages different from each other by making the number of the passages different from each other.

In an example shown in FIG. 8, the number of an outlet side oxidizing gas passages 58c provided in a plate-like intermediate separator 32c is smaller than the number of an inlet side oxidizing gas passages 46c provided in a plate-like first separator 28c, and similarly, the number of an outlet side fuel gas passages 52c provided in a plate-like second separator 30c is smaller than the number of an inlet side fuel gas passages 56c provided in the intermediate separator 32c. With this configuration, as the additional effect, the contact area between the first and second unit cells 14 and 16 can be effectively increased.

Further, to improve the drainage characteristics in the first and second unit cells 14 and 16, the gas passage length in the second unit cell 16 on the outlet side may be set to be greater than the gas passage length in the first unit cell 14 on the inlet side. Since the amount of produced water becomes larger on the outlet side, the drainage characteristic of the produced water can be improved by making the gas passage length on the outlet side greater, thereby generating a pressure drop on the outlet side.

Figure 9:
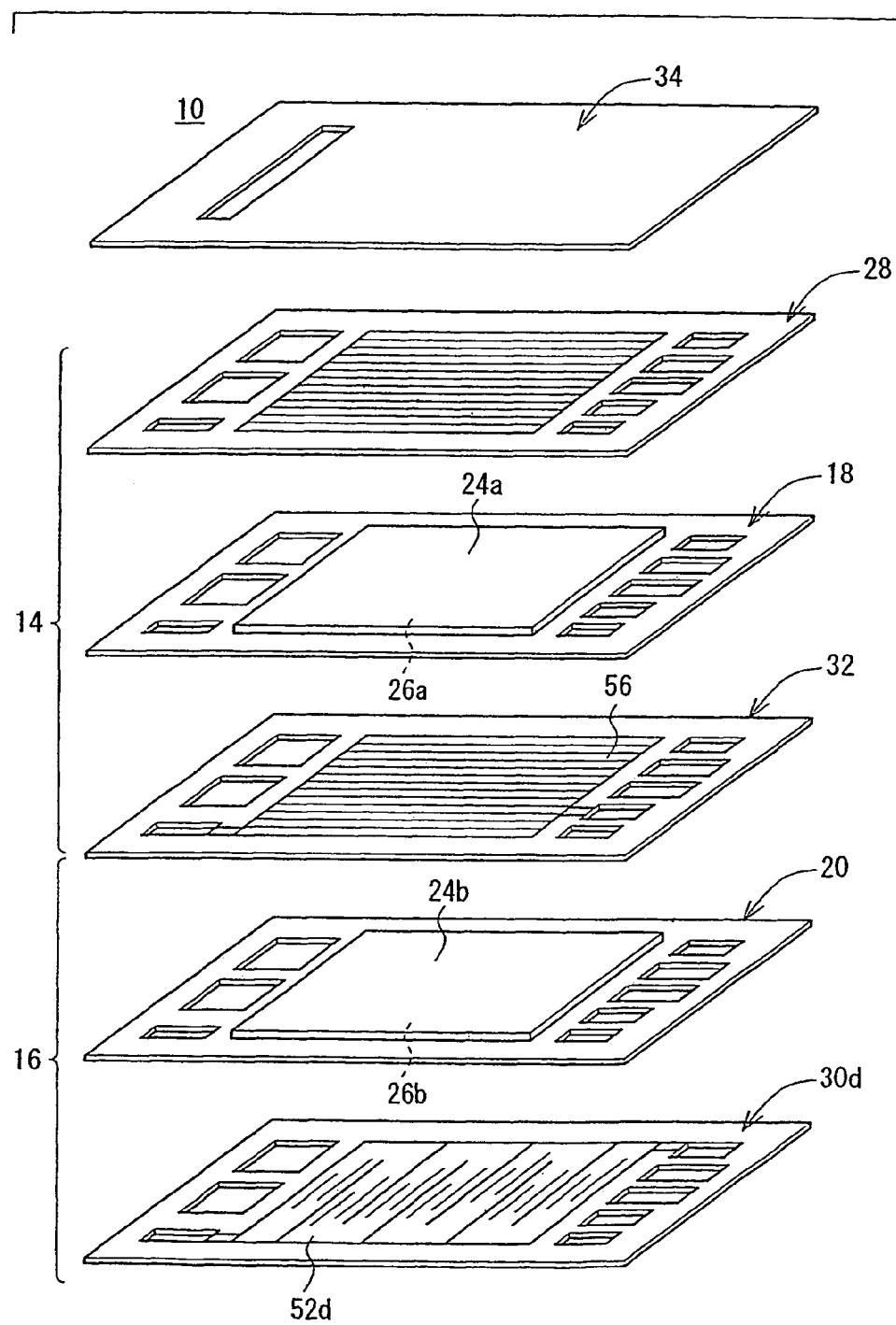
FIG. 9 is an exploded perspective view of the cell assembly in which the passage lengths are changed.

To be more specific, as shown in FIG. 9, fuel gas passages 56 are provided in an intermediate separator 32 in such a manner as to linearly extend, while fuel gas passages 52d are provided in a second separator 30d in such a manner as to meanderingly extend. Accordingly, the gas passage length of the fuel gas passages 52d on the outlet side is effectively greater than the gas passage length of the fuel gas passages 56 on the inlet side. In addition, the meandering fuel gas passages 52d may be replaced with bent or curved fuel gas passages.

In the first embodiment, since the cell assembly 10 is formed of an integral body of a plurality of unit cells, for example, the two unit cells 14 and 16, it is possible to effectively simplify the workability at the time of assembly of the fuel cell stack 12 by stacking the cell assemblies 10 to each other, as compared with the assembly of the conventional fuel cell stack by stacking units cells to each other.

Further, the miniaturization of each cell assembly 10 easily leads to miniaturization of the whole fuel cell stack 12. With respect to miniaturization of the cell assembly 10, since each of the first and second separators 28 and 30 and the intermediate separator 32 is formed of the metal sheet formed into a corrugated shape (shape of projections and depressions), the separator can be thinned, with a result that the whole cell assembly 10 can be also thinned.

In the first embodiment, the intermediate separator 32 has, on the side facing to the first unified body 18, the fuel gas passages 56 and also has, on the side facing to the second unified body 20, the oxidizing gas passages 58 (see FIG. 3). Accordingly, the structure of the intermediate separator 32 becomes thinner than that of a structure in which the fuel gas passages 56 and the oxidizing gas passages 58 are individually provided in two separators. This makes it possible to miniaturize the whole cell assembly 10.

Since each of the first and second separators 28 and 30 and the intermediate separator 32 has the oxidizing gas inlets 36a, oxidizing gas outlets 36b, fuel gas inlets 42a, and fuel gas outlets 42b respectively communicated to each other in the stacking direction of the first and second unit cells 14 and 16, it is possible to eliminate the need of provision of a separate manifold (external manifold) outside the cell assembly 10 and thereby also eliminate the need of provision of a seal structure at an end portion of the external manifold in the stacking direction of the units cells, and hence to miniaturize the cell assembly 10 and simplify the configuration thereof.

In the first embodiment, as shown in FIG. 5, the reaction gas, for example, the oxidizing gas flows along the cathode 24a of the first unified body 18 via the oxidizing gas passages 46, being moved in the direction shown by the arrow A (stacking direction) via the oxidizing gas intermediate communication holes 40, and flows along the cathode 24b of the second unified body 20 via the oxidizing gas passages 58.

Accordingly, since the oxidizing gas meanderingly flows along the oxidizing gas passages toward the oxidizing gas intermediate communication hole for allowing the oxidizing gas to flow in the stacking direction of the first and second unit cells 14 and 16, it is possible to obtain advantages that the length of the passage through which the first and second unit cells 14 and 16 are communicated to each other is reduced and also the temperature gradient is easier to be formed along the flow direction of the oxidizing gas (fuel gas). Further, since the fuel gas and the oxidizing gas flow in the directions opposite to each other along the reaction planes of the first and second unified bodies 18 and 20, it is possible to desirably humidify the anodes 26a and 26b by water produced from the cathodes 24a and 24b.

Further, in the first embodiment, since any coolant passage is not provided between the first and second unit cells 14 and 16, the temperature of the second unit cell 16 on the outlet side becomes higher than that of the first unit cell 14 on the inlet side, with a result that the drainage characteristic of produced water can be improved.

Figure 12:
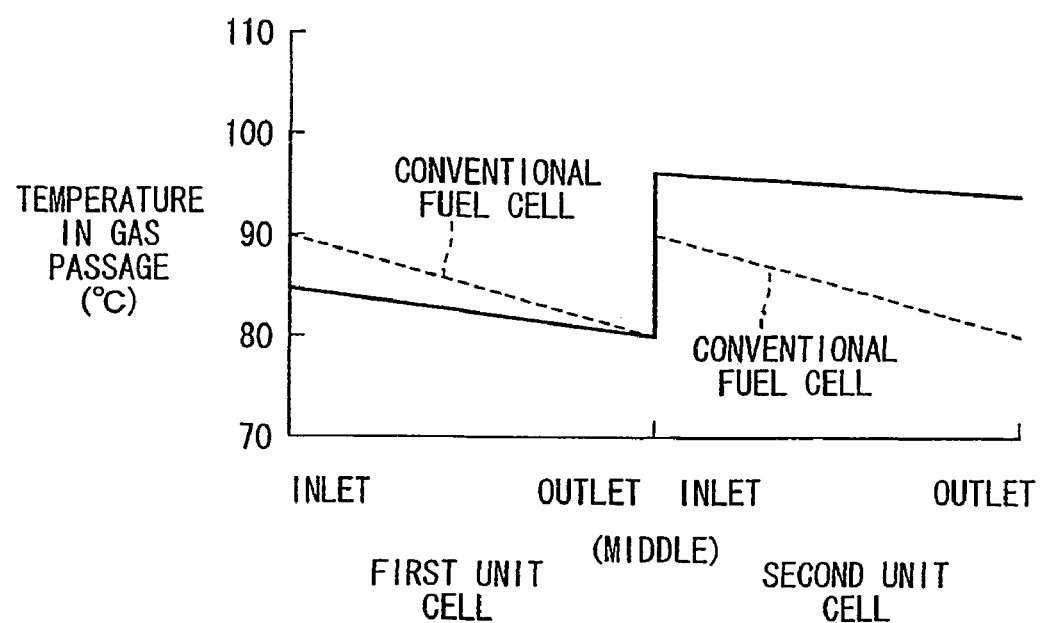
FIG. 12 is a graph illustrating temperatures of cathodes in first and second unit cells.
Figure 13:
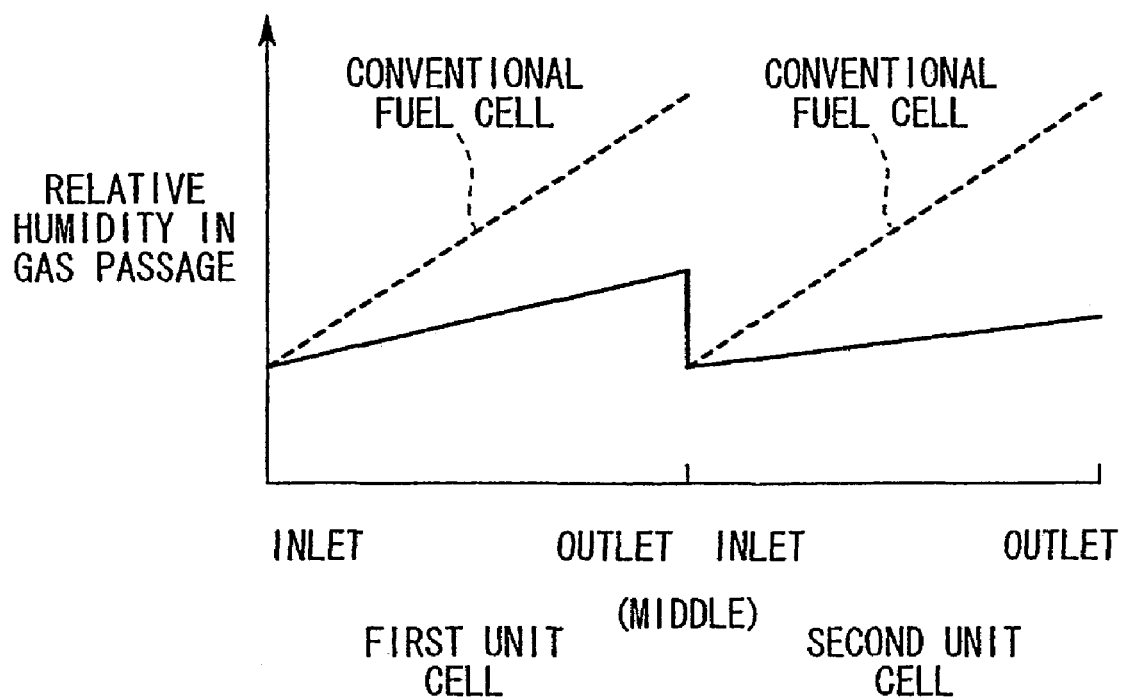
FIG. 13 is a graph illustrating relative humidities of the cathodes in the first and second unit cells.

By making the temperature in the gas passages on the second unit cell 16 side higher than that on the first unit cell 14 side as shown in FIG. 12, a relative humidity in the gas passages is changed between the first and second unit cells 14 and 16 as shown in FIG. 13. In the first unit cell 14, a change in humidity is reduced because the oxidizing gas in an amount required for reaction in the first and second unit cells 14 and 16 is supplied to the first unit cell 14, and in the second unit cell 16, a change in humidity is also reduced because the temperature of the second unit cell 16 is raised.

With this configuration, since the relative humidities in the first, and second unit cells 14 and 16 are equalized, it is possible to improve the ion conductivity of each of the electrolyte membranes 22a and 22b and hence to reduce the concentration overpotential.

By the way, according to the first embodiment, the oxidizing gas intermediate communication holes 40 are provided between the oxidizing gas inlets 36a and the oxidizing gas outlets 36b, and the fuel gas intermediate communication holes 38 are provided between the fuel gas inlets 42a and the fuel gas outlets 42b.

Figure 10:
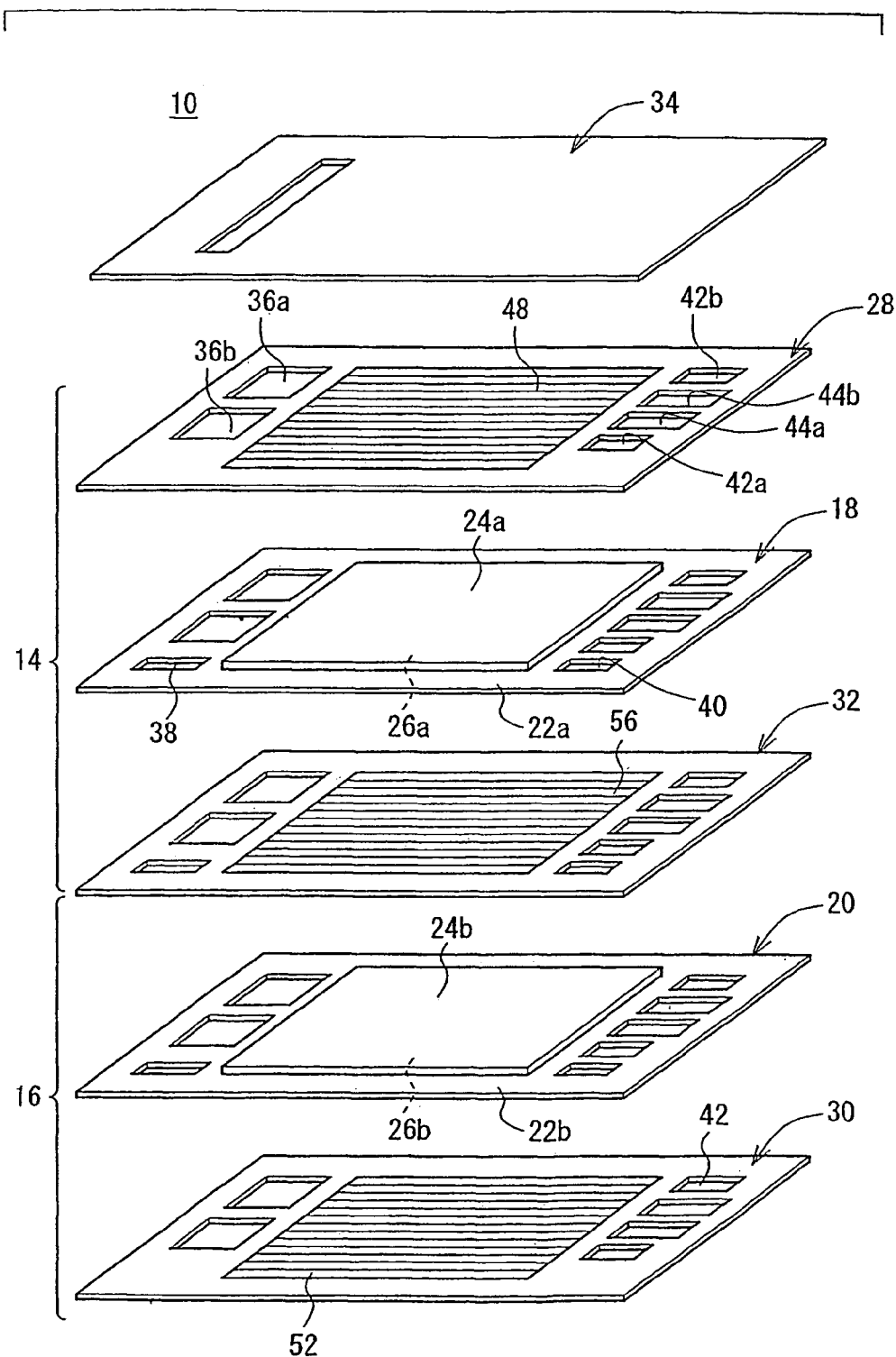
FIG. 10 is an exploded perspective view of a structure of the cell assembly in which intermediates communication holes are communicated to each other only in each cell.

The oxidizing gas intermediate communication holes 40 and the fuel gas intermediate communication holes 38 are respectively provided in such a manner as to pass through the first and second unit cells 14 and 16 in the direction shown by the arrow A. However, unlike such a structure of the first embodiment, there may be adopted a structure shown in FIG. 10 in which each of the first and second separators 28 and 30 has no oxidizing gas intermediate communication hole 40 and no fuel gas intermediate communication hole 38. In this case, only in each cell of the cell assembly 10, the oxidizing gas intermediate communication holes 40 allow the oxidizing gas to flow therethrough in the direction shown by the arrow A and the fuel gas intermediate communication holes 38 allows the fuel gas to flow therethrough in the direction shown by the arrow A.

Figure 11:
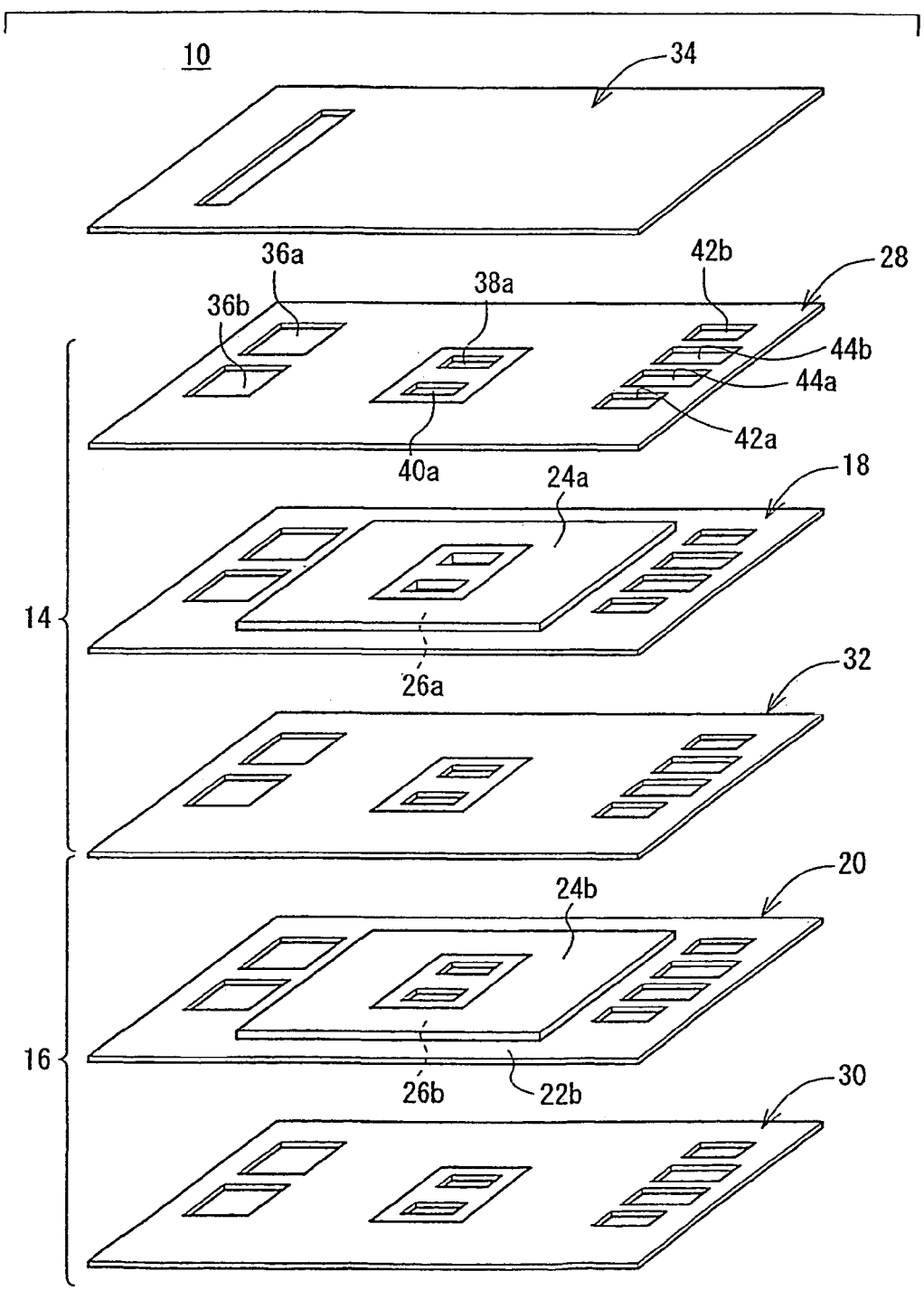
FIG. 11 is an exploded perspective view of a structure of the cell assembly in which an intermediate communication holes are provided in central planes.

Further, as shown in FIG. 11, an oxidizing gas intermediate communication hole 40a and a fuel gas intermediate communication hole 38a may be provided in a central plane of each of the first and second separators 28 and 30 and the intermediate separator 32.

Next, methods of supplying reaction gases in the cell assembly 10 and in the fuel cell stack 12 composed of the stack of the cell assemblies 10 according to the present invention will be described below. It is to be noted that the gas supply is basically performed in accordance with the above-described operations of the cell assembly 10 and the fuel cell stack 12, and therefore, only the features of the gas supply methods will be briefly described.

As shown in FIG. 5, an oxidizing gas and a fuel gas are supplied in parallel to the plurality of oxidizing gas passages 46 and the plurality of fuel gas passages 56 from the oxidizing gas inlets 36a and the fuel gas inlets 42a as the reaction gas supply passages provided in the stacking direction shown by the arrow A of the first and second unit cells 14 and 16. Accordingly, the spent oxidizing gas and fuel gas, which have been used for reaction at the first and second unified bodies 18 and 20, are discharged from the oxidizing gas outlets 36b and the fuel gas outlets 42b as the reaction gas discharge passages provided in the direction shown by the arrow A.

In this case, in the cell assembly 10, the oxidizing gas and fuel gas are introduced in the first unit cell 14 on the upstream side to be used for reaction, and then introduced in the second unit cell 16 on the downstream side via the oxidizing gas intermediate communication holes 40 and the fuel gas intermediate communication holes 38. As a result, the flow rate, flow velocity, and pressure drop of each of the oxidizing gas and fuel gas can be increased, so that the reaction performances of the first and second unit cells 14 and 16 can be effectively improved.

Here, each of the oxidizing gas and fuel gas in an amount required to be used in the whole cell assembly 10, that is, in amount required for reaction in the first and second unit cells 14 and 16, is introduced in the first unit cell 14 on the upstream side in the flow direction of the reaction gas.

Figure 14:
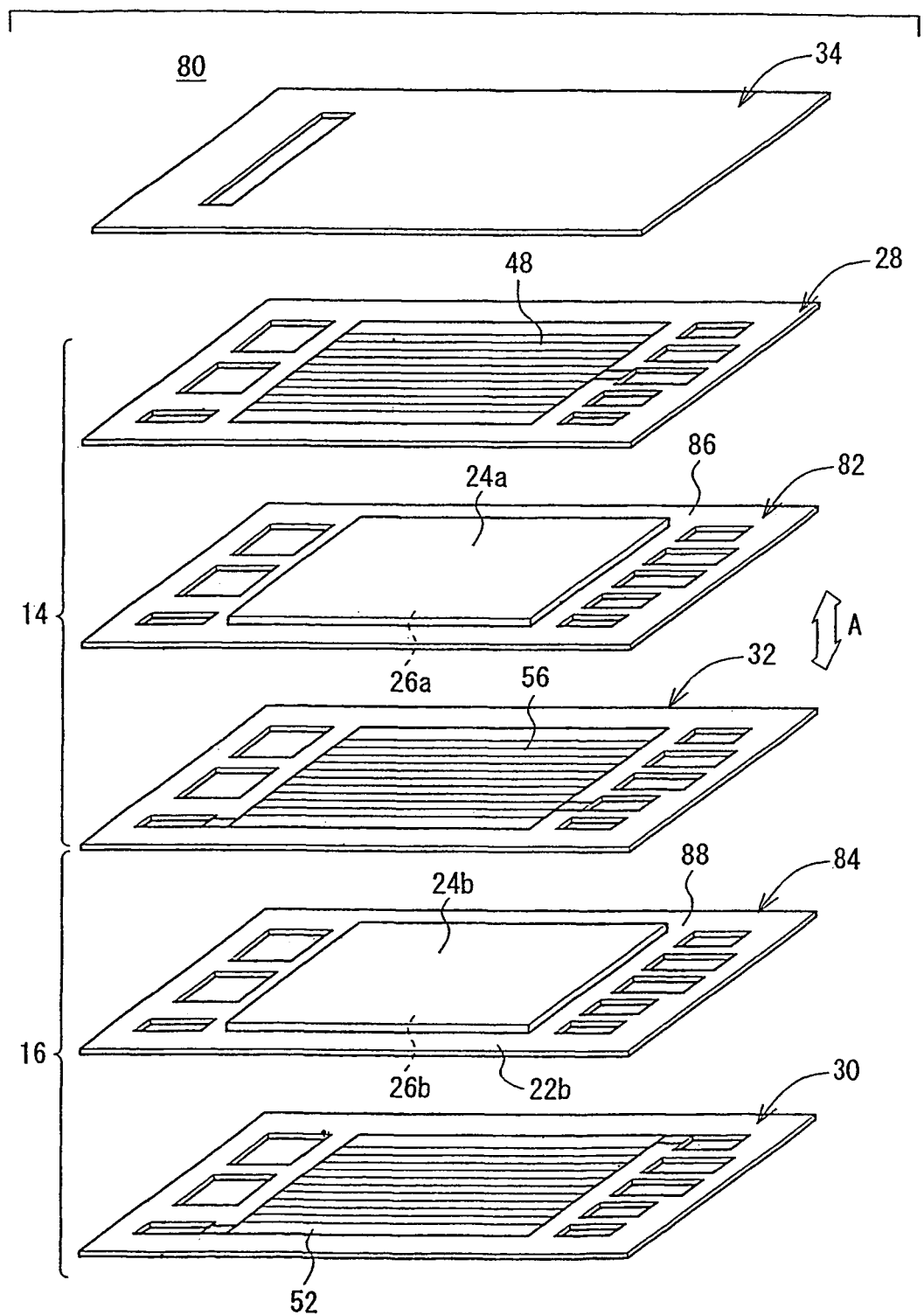
FIG. 14 is an exploded perspective view of an essential portion of a solid polymer electrolyte fuel cell assembly according to a second embodiment of the present invention.

FIG. 14 is an exploded perspective view of an essential portion of a cell assembly 80 according to a second embodiment of the present invention. In the cell assembly 80 according to this embodiment, parts corresponding to those in the cell assembly 10 according to the first embodiment are designated by the same reference numerals and the overlapped description thereof is omitted. The same is true for the following third and later embodiments.

The cell assembly 80 includes a first unified body 82 and a second unified body 84. The first unified body 82 has a fluorine based electrolyte membrane 86, and the second unified body 84 has a hydrocarbon based electrolyte membrane 88.

According to the second embodiment configured as described above, since the temperature of the second unified body 84 on the downstream side of the flow direction of a reaction gas is higher than that of the first unified body 82 on the upstream side in the flow direction of the reaction gas, the hydrocarbon based electrolyte membrane 88 having a high heat resistance is provided in the second unified body 84. With this configuration, the useful life of the second unified body 84 can be improved. As a result, since the second unified body 84 can be used for a long period of time, it is possible to enhance the economical merit of the cell assembly 80.

Figure 15:
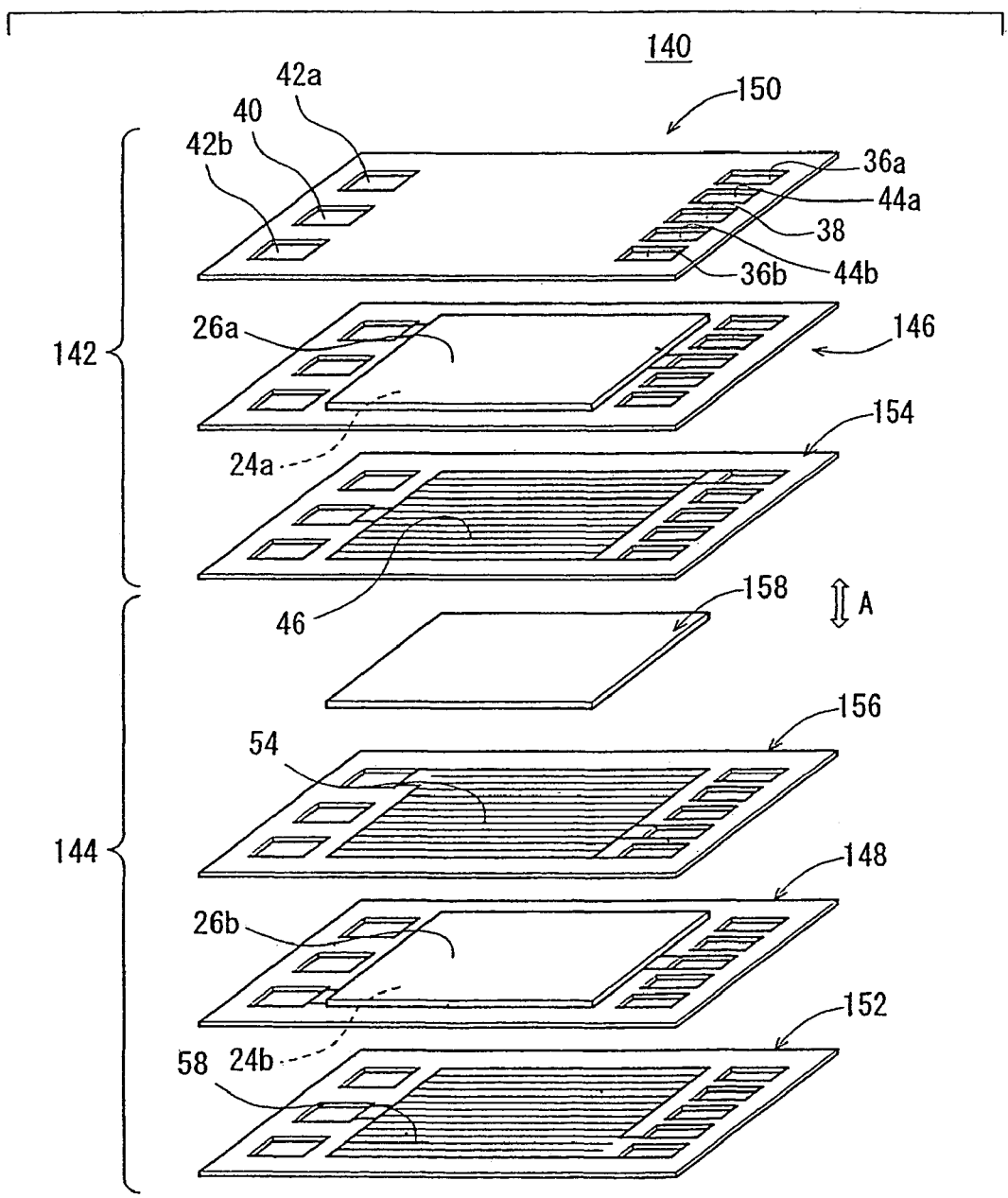
FIG. 15 is an exploded perspective view of an essential portion of a solid polymer electrolyte fuel cell assembly according to a third embodiment of the present invention.

FIG. 15 is an exploded perspective view of an essential portion of a solid polymer electrolyte fuel cell assembly 140 according to a third embodiment of the present invention.

The cell assembly 140 includes a first unit cell 142 and a second unit cell 144 which are stacked to each other. The first unit cell 142 has a first unified body 146, and the second unit cell 144 has a second unified body 148. The first unified body 146 is held between a first separator 150 and a first intermediate separator 154, and the second unified body 148 is held between a second intermediate separator 156 and a second separator 152. A baffle plate 158 is interposed between the first and second intermediate separators 154 and 156.

The cell assembly 140 has, on one edge portion in the long-side direction, fuel gas inlets 42a, oxidizing gas intermediate communication holes 40, and fuel gas outlets 42b. The fuel gas inlets 42a (oxidizing gas intermediate communication holes 40, fuel gas outlets 42b) are communicated to each other in the direction shown by an arrow A. The cell assembly 140 also has, on the other edge portion in the long-side direction, oxidizing gas inlets 36a, coolant inlets 44a, fuel gas intermediate communication holes 38, coolant outlets 44b, and oxidizing gas outlets 36b. The oxidizing gas inlets 36a (coolant inlets 44a, fuel gas intermediate communication holes 38, coolant outlets 44b, oxidizing gas outlets 36b) are communicated to each other in the direction shown by the arrow A.

Coolant passages 54 are provided on a surface, facing to the baffle plate 158, of each of the first and second intermediate separators 154 and 156 in such a manner as to linearly extend. One-ends of the coolant passages 54 provided in the first intermediate separator 154 are communicated to the coolant inlet 44a of the first intermediate separator 154, and the other ends of the coolant passages 54 provided in the first intermediate separator 154 are returned from the baffle plate 158 and are communicated to the coolant passages 54 provided in the second intermediate separator 156. The coolant passages 54 provided in the second intermediate separator 156 are communicated to the coolant outlet 44b provided in the second intermediate separator 156.

Figure 16:
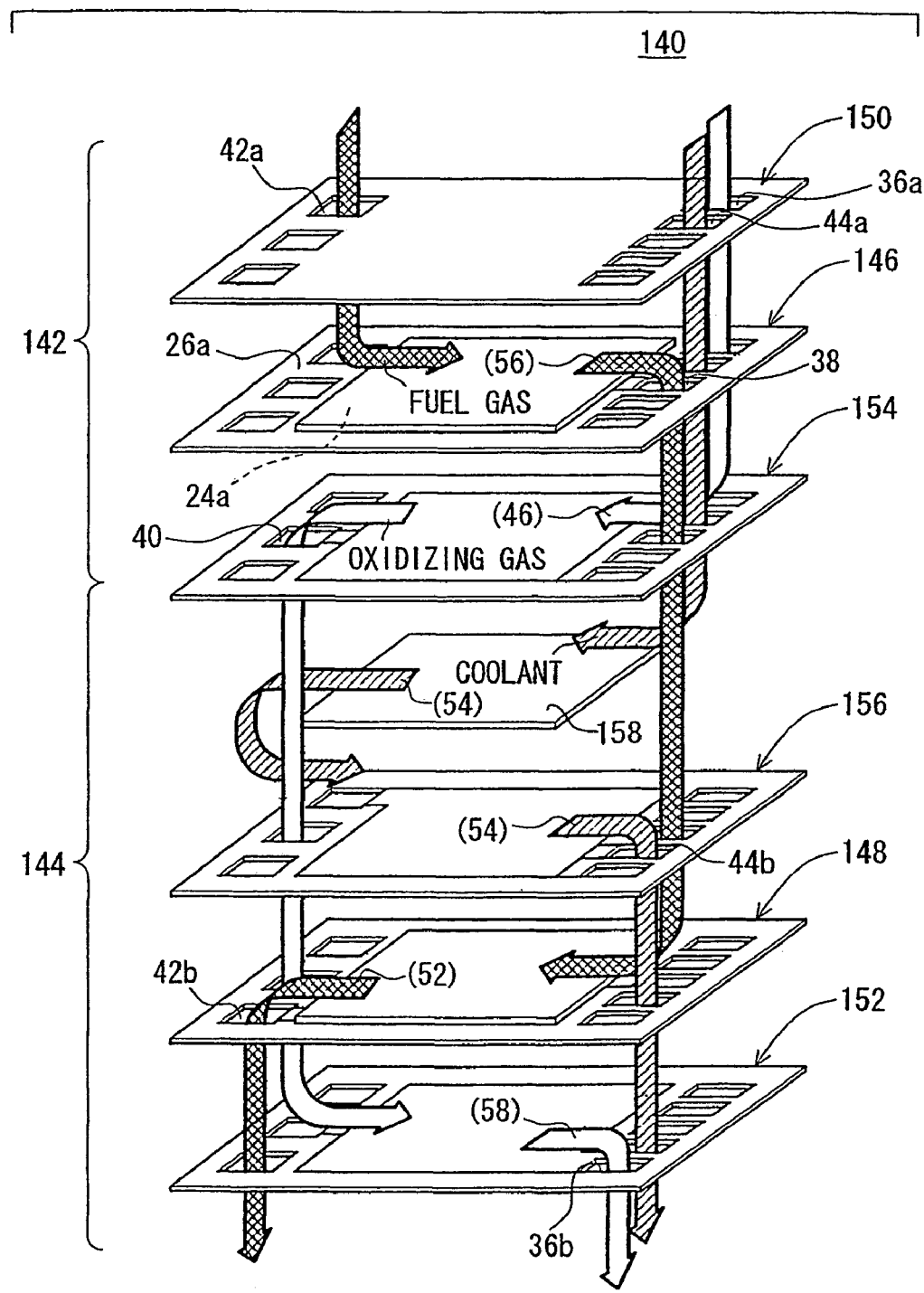
FIG. 16 is a view showing flows of reaction gases and a coolant in the cell assembly according to the third embodiment of the present invention.

In the cell assembly 140 configured as described above, an oxidizing gas, a fuel gas, and a coolant are supplied in series to the first and second unit cells 142 and 144 along the flow direction shown in FIG. 16. At this time, the coolant passages 54 are formed between the first and second unit cells 142 and 144 via the baffle plate 158. As a result, in particular, it is possible to prevent the temperature in the cell assembly 140 from being excessively raised.

Figure 17:
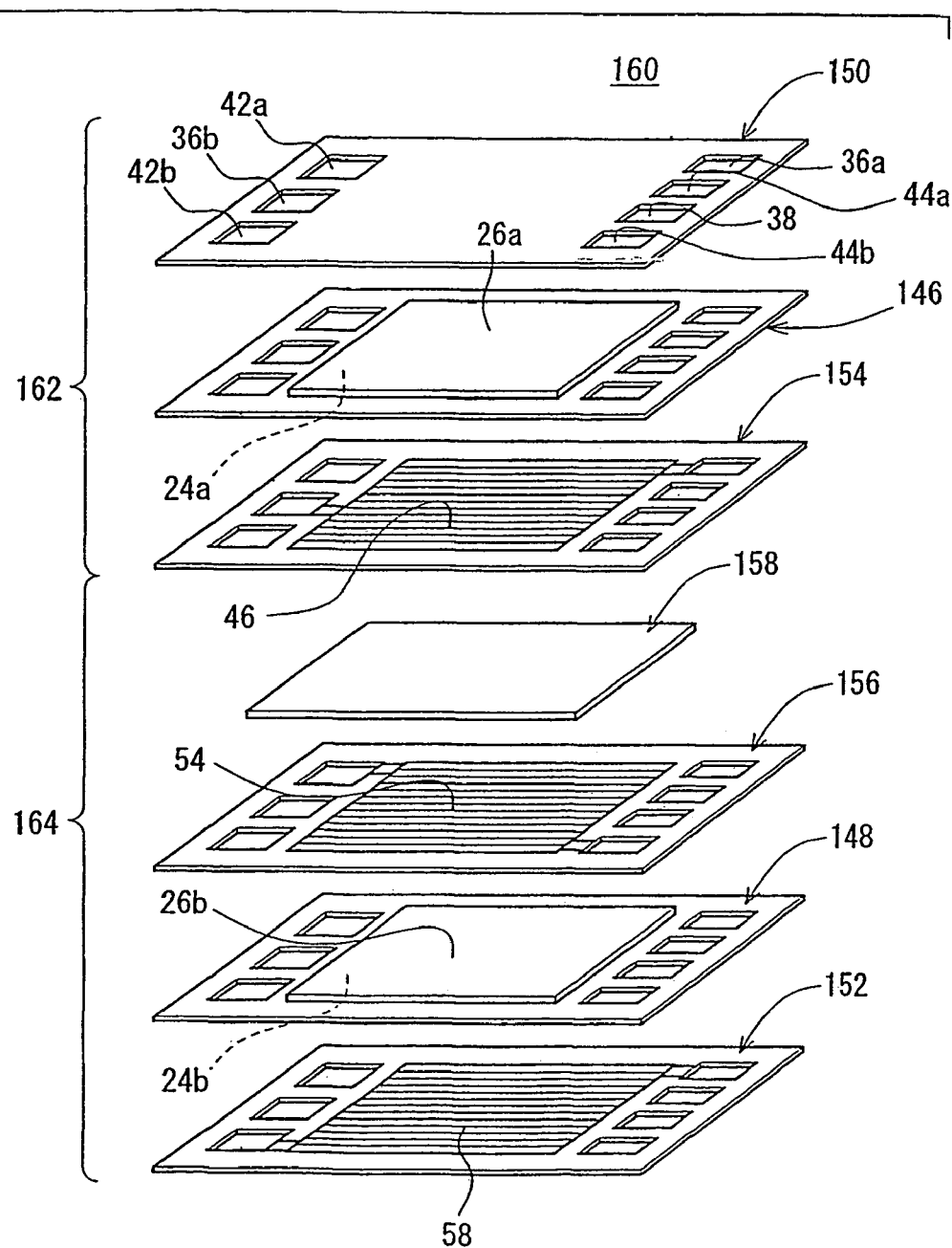
FIG. 17 is an exploded perspective view of an essential portion of a solid polymer electrolyte fuel cell assembly according to a fourth embodiment of the present invention.

FIG. 17 is an exploded perspective view of an essential portion of a solid polymer electrolyte fuel cell assembly 160 according to a fourth embodiment of the present invention. In the cell assembly 160 according to the fourth embodiment, parts corresponding to those in the cell assembly 140 according to the third embodiment shown in FIG. 15 are designated by the same reference numerals and the overlapped description thereof is omitted.

Figure 18:
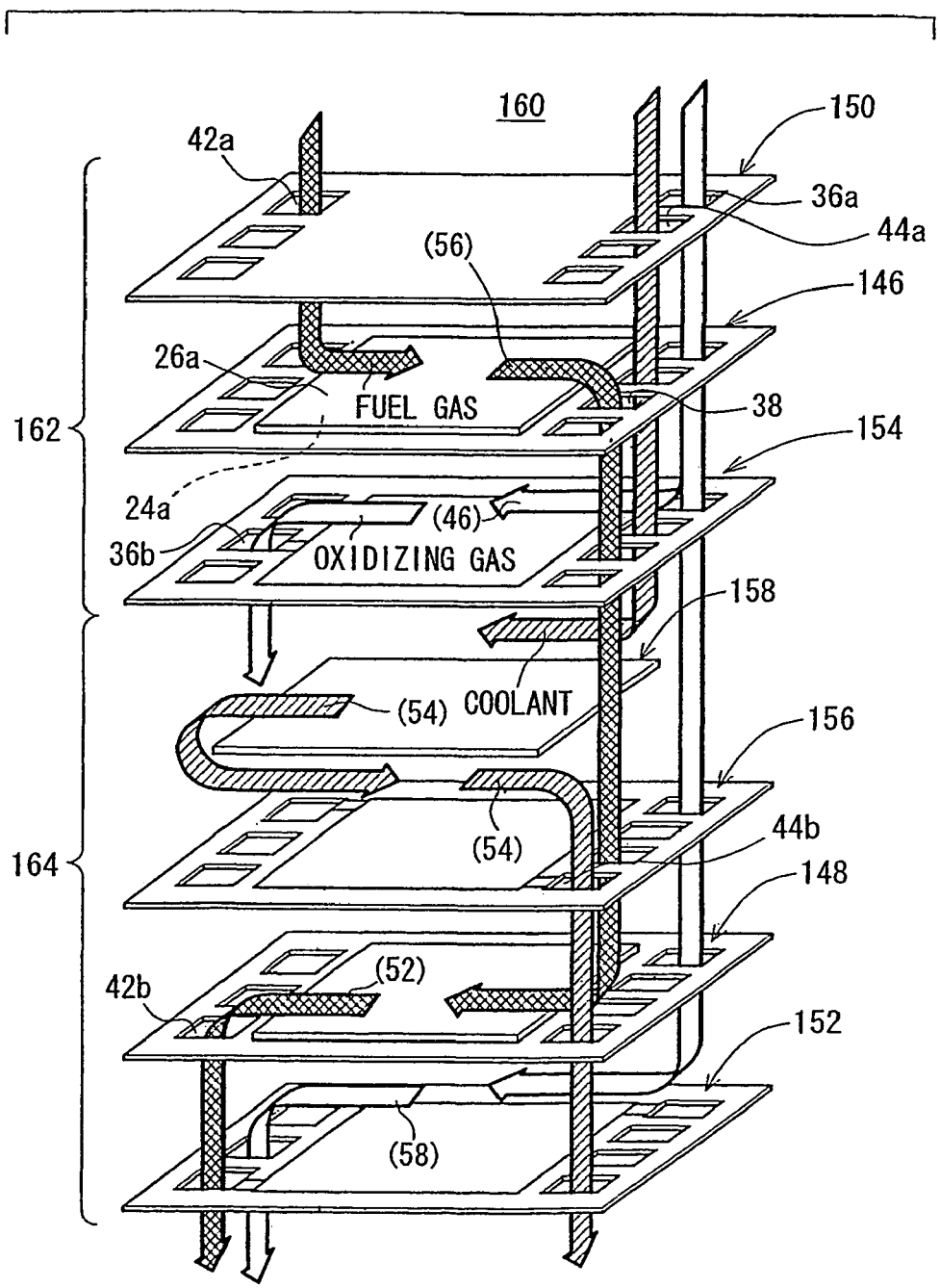
FIG. 18 is a view showing flows of reaction gases and a coolant in the cell assembly according to the fourth embodiment of the present invention.

The cell assembly 160, which includes a first unit cell 162 and a second unit cell 164 which are stacked to each other in the direction shown by an arrow A, is characterized in that the oxidizing gas intermediate communication holes 40 provided in the cell assembly 140 shown in FIG. 15 are not provided. Accordingly, in the cell assembly 160, as shown in FIG. 18, a fuel gas flows along fuel gas passages 56 and 52, which are provided in the first and second unit cells 162 and 164 respectively in such a manner as to be communicated in series to each other, and an oxidizing gas flows along oxidizing gas passages 46 and 58, which are provided in the first and second unit cells 162 and 164 in such a manner as to be individually, that is, in parallel to each other. That is to say, the fuel gas is supplied to the first and second unit cells 162 and 164 in series, and the oxidizing gas is supplied to the first and second unit cells 162 and 164 in parallel.

In this embodiment, since the fuel gas having a low viscosity flows along the fuel gas passages 56 and 52 communicated to each other in series, the whole length of the fuel gas passages becomes greater, to thereby give a sufficient pressure drop, with a result that produced water can be effectively discharged from anodes 26a and 26b facing to the fuel gas passages 56 and 52.

Figure 19:
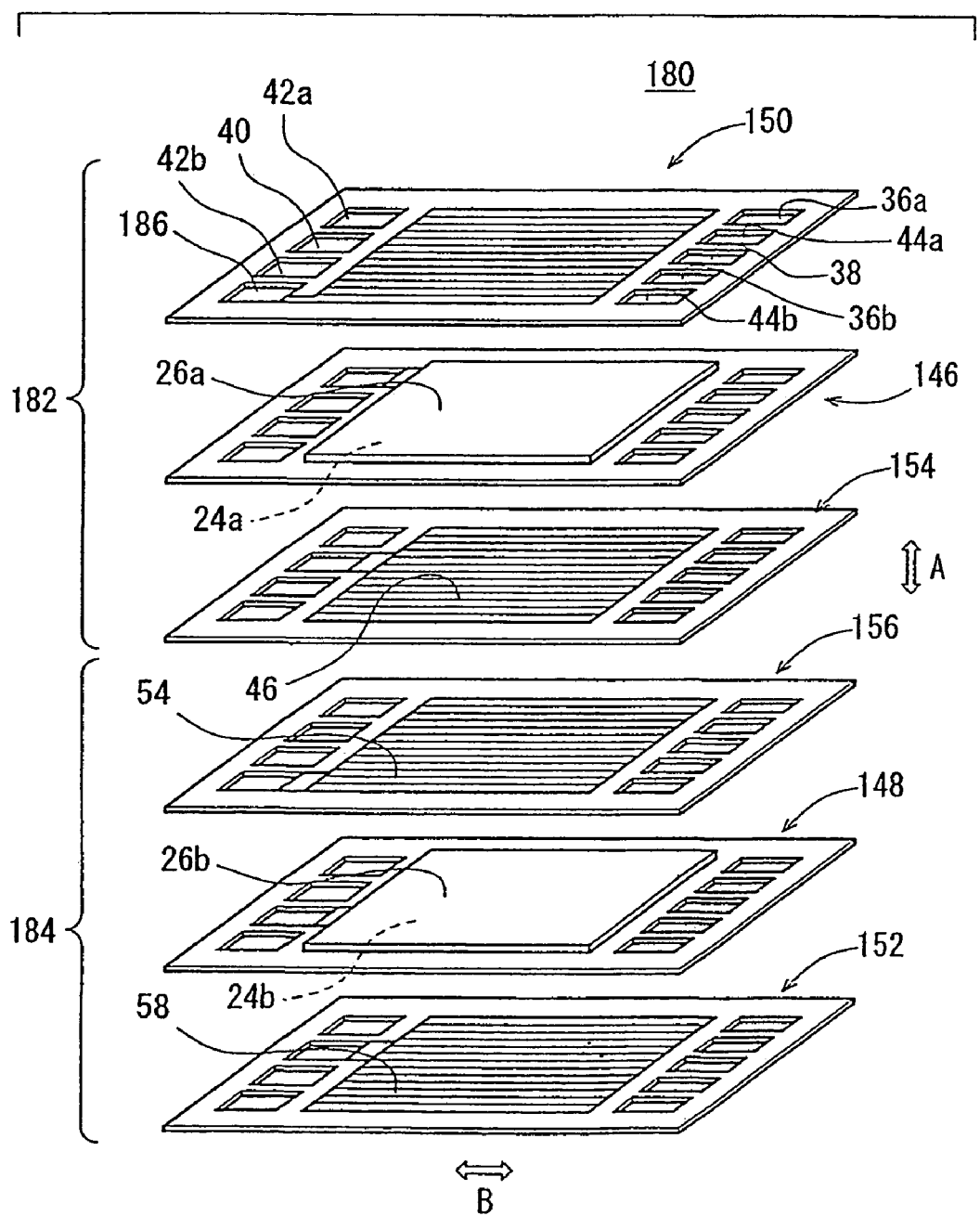
FIG. 19 is an exploded perspective view of an essential portion of a solid polymer electrolyte fuel cell assembly according to a fifth embodiment of the present invention.
Figure 20:
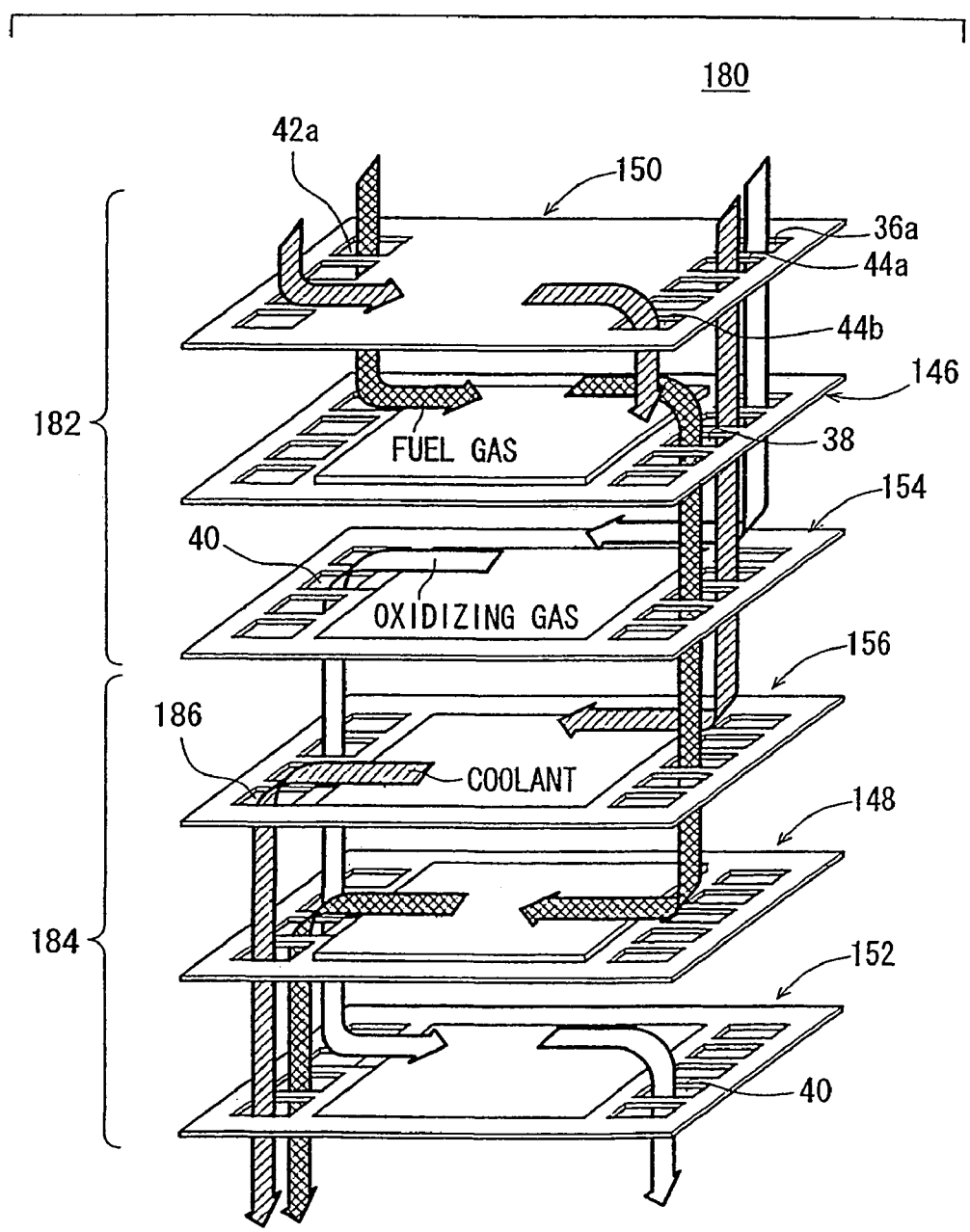
FIG. 20 is a view showing flows of reaction gases and a coolant in the cell assembly according to the fifth embodiment of the present invention.

FIG. 19 is an exploded perspective view of an essential portion of a solid polymer electrolyte fuel cell assembly 180 according to a fifth embodiment of the present invention, and FIG. 20 is a view showing flows of an oxidizing gas, a fuel gas, and a coolant in the cell assembly 180. In the cell assembly 180 according to the fifth embodiment, parts corresponding to those in the cell assembly 140 according to the third embodiment shown in FIG. 15 are designated by the same reference numerals and the overlapped description thereof is omitted.

The cell assembly 180 includes a first unit cell 182 and a second unit cell 184 which are stacked to each other in the direction shown by an arrow A. The cell assembly 180 has, on a one-edge portion in the long-side direction, fuel gas inlets 42a, oxidizing gas intermediate communication holes 40, fuel gas outlets 42b, and coolant intermediate communication holes 186.

In the cell assembly configured as described above, as shown in FIG. 20, a coolant flows through the coolant inlets 44a in the direction shown by an arrow A to be introduced between first and second intermediate separators 154 and 156, and is moved along coolant passages 54 provided in the second intermediate separator 156 in the plane direction shown by an arrow B. The coolant is then introduced to a coolant intermediate communication hole 186 provided in a one-edge portion in the long-side direction of the second intermediate separator 156, and moved in the direction shown by the arrow A; and is introduced from a coolant intermediate communication hole 186 provided in the second intermediate separator 156 to a surface, opposed to the side oxidizing gas passages 58 are provided, of the second separator 152, and is returned, that is, discharged in the coolant outlet 44b of the second separator 152.

Figure 21:
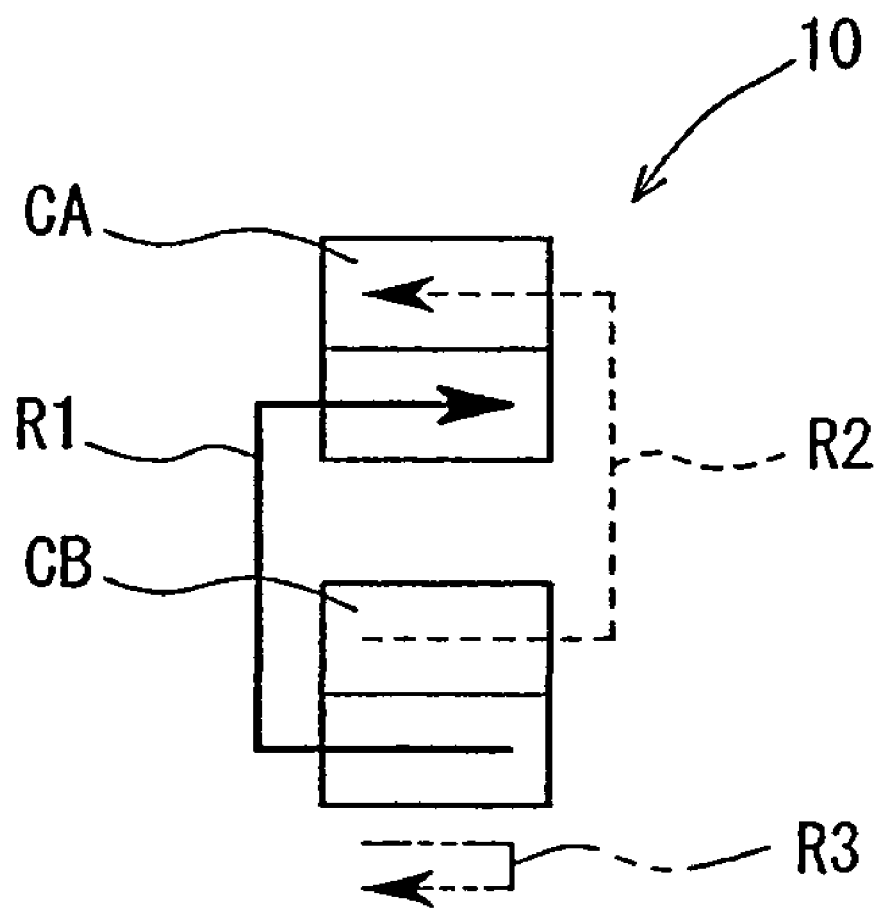
FIG. 21 is a diagram showing a symbolized passage configuration of the cell assembly according to the first embodiment.

By the way, the passage configuration of the cell assembly 10 according to the first embodiment can be symbolized as shown in FIG. 21. In this figure, the first and second unit cells 14 and 16 constituting the cell assembly 10 are designated by CA and CB, respectively, and the passages of the oxidizing gas, fuel gas, and coolant are expressed by R1, R2, and R3, respectively.

Figure 22:
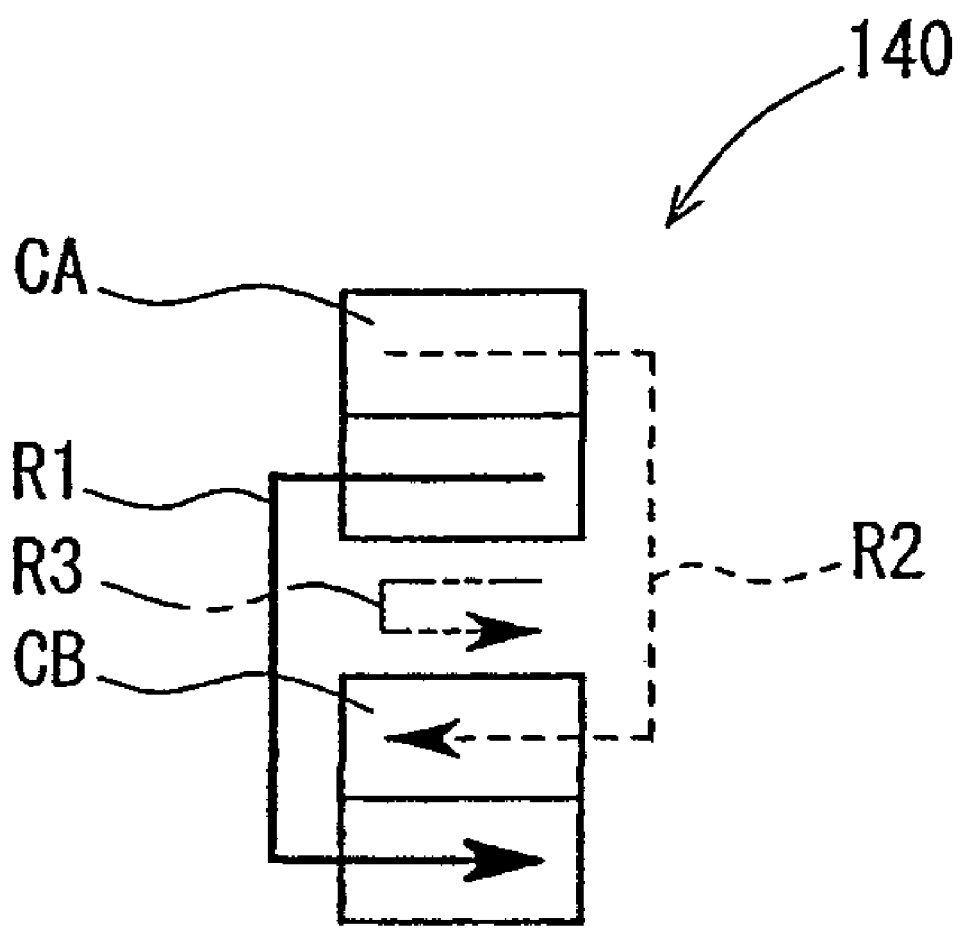
FIG. 22 is a diagram showing a symbolized passage configuration of the cell assembly according to the third embodiment.
Figure 23:
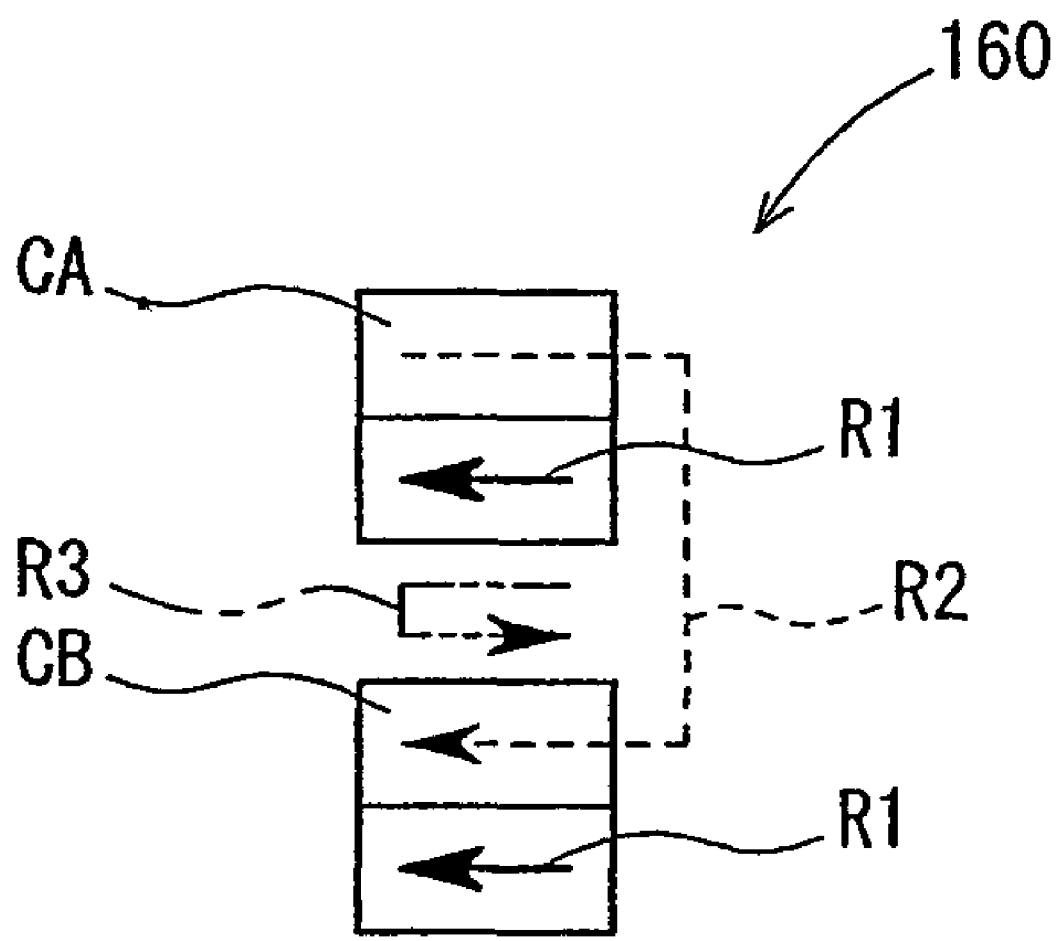
FIG. 23 is a diagram showing a symbolized passage configuration of the cell assembly according to the fourth embodiment.
Figure 24:
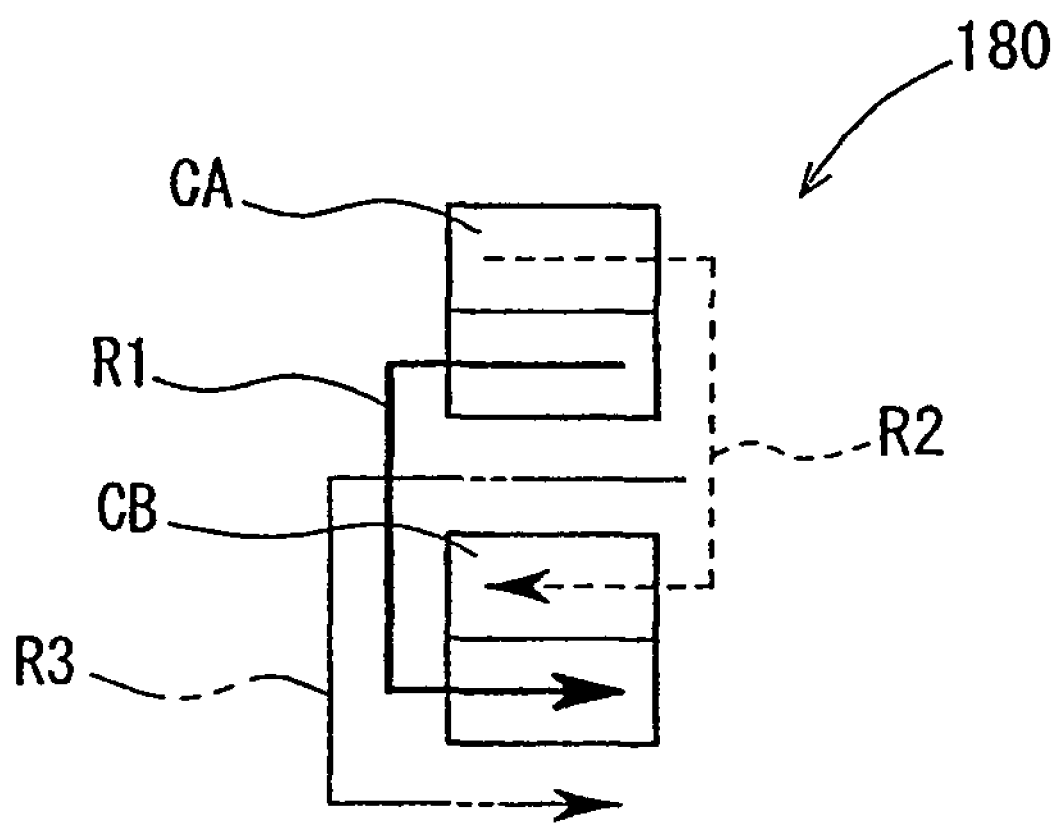
FIG. 24 is a diagram showing a symbolized passage configuration of the cell assembly according to the fifth embodiment.

Similarly, the passage configuration of the cell assembly 140 according to the third embodiment can be symbolized as shown in FIG. 22; the passage configuration of the cell assembly 160 according to the fourth embodiment can be symbolized as shown in FIG. 23; and the passage configuration of the cell assembly 180 according to the fifth embodiment can be symbolized, as shown in FIG. 24. Accordingly, various kinds of different passage configurations can be obtained by selectively combining the passage configurations shown in FIGS. 21 to 24 with each other.

Next, typical combinations of passage configurations will be described with reference to the drawings. It is to be noted that the passages R1, R2 and R3 can be variously changed by reversing the flow direction of the passages or changing the positions of the passages on the right or left side to positions on the left or right side, and therefore, the description of such variations is omitted, and that in the following passage combinations, only the combinations of the oxidizing gas passages R1 and the coolant passages R3 are shown and the description of the configuration the fuel gas passages R2 is omitted because the configurations of the fuel gas passages R2 can be variously incorporated in the combinations of the oxidizing gas passages R1 and the coolant passages R3.

Figure 25:
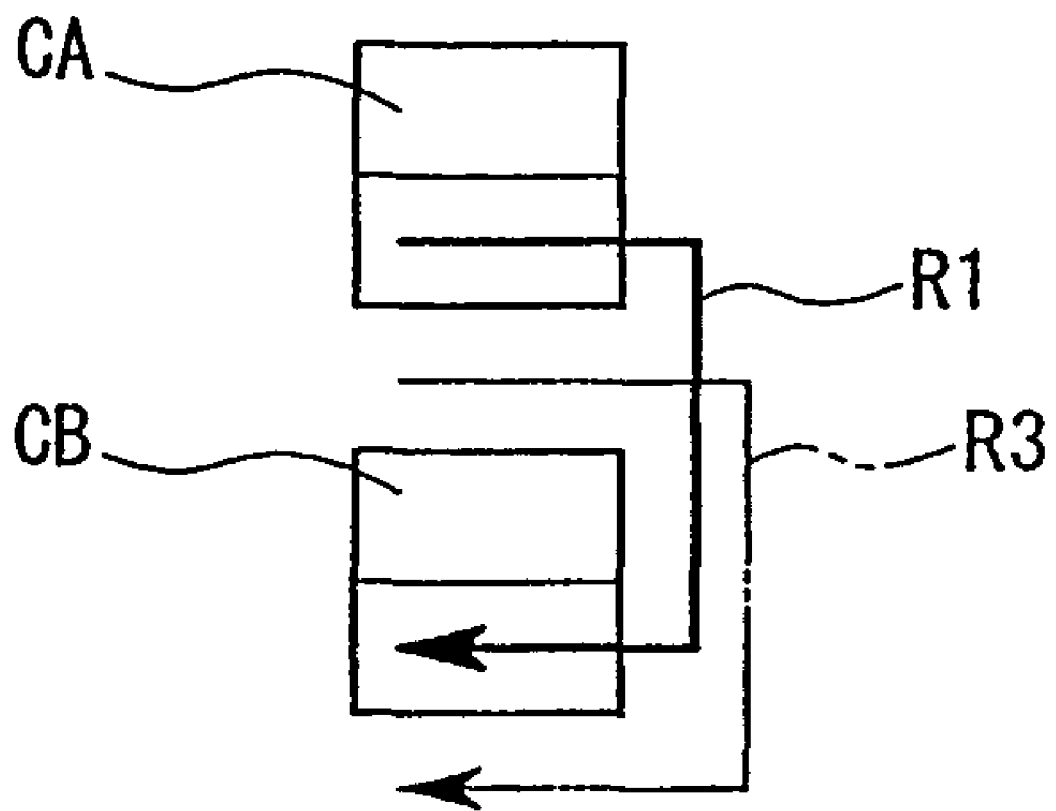
FIG. 25 is a diagram showing a typical symbolized passage configuration.

FIG. 25 shows a passage configuration in which the oxidizing gas passage R1 extends in series from the cell CA to the cell CB, and the coolant passage R3 extends along a U-shaped line from a portion between the cells CA and CB to the outside of the cell CB. With this configuration, in the cells CA and CB, the temperature becomes higher toward oxidizing gas outlets in the plane direction, so that the humidities in the cells CA and CB are equalized and also the temperature of the cell CB on the outlet side becomes higher in the stacking direction of the cells CA and CB, with a result that the humidities in the whole cell assembly can be equalized.

Since the oxidizing gas flows in series from the cell CA side to the cell CB side, the flow rate per unit cell of the oxidizing gas in the cell CA is increased, so that the humidities along the plane direction of the cell CA are equalized, and further the drainage characteristic is improved due to an increase in flow rate of the oxidizing gas and the distributions of the oxidizing gas and fuel gas into the cells CA and CB are equalized due to an increase in pressure drop. Further, since the coolant flows in series and is returned in the U-shape, the flow rate per unit cell of the coolant becomes large, so that the temperature rise along the plane direction of the cells CA and CB can be reduced and also the humidities in the cells CA and CB can be equalized.

Figure 26:
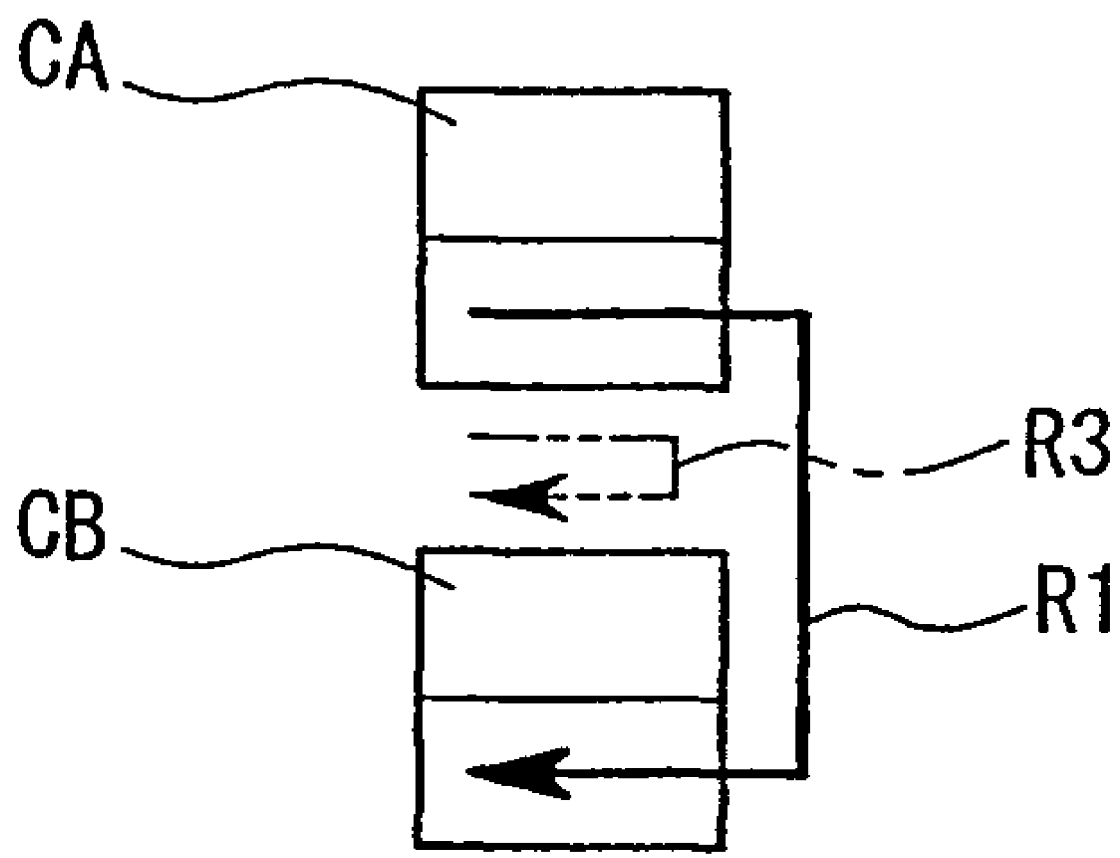
FIG. 26 is a diagram showing another symbolized passage configuration.

FIG. 26 shows a passage configuration in which the oxidizing gas passage R1 extends along a U-shape line from the cell CA to the cell CB and the coolant passage R3 extends along a U-shape line between the cells CA and CB. With this configuration, the same effects as those obtained by the passage configuration shown in FIG. 25 can be obtained.

Figure 27:
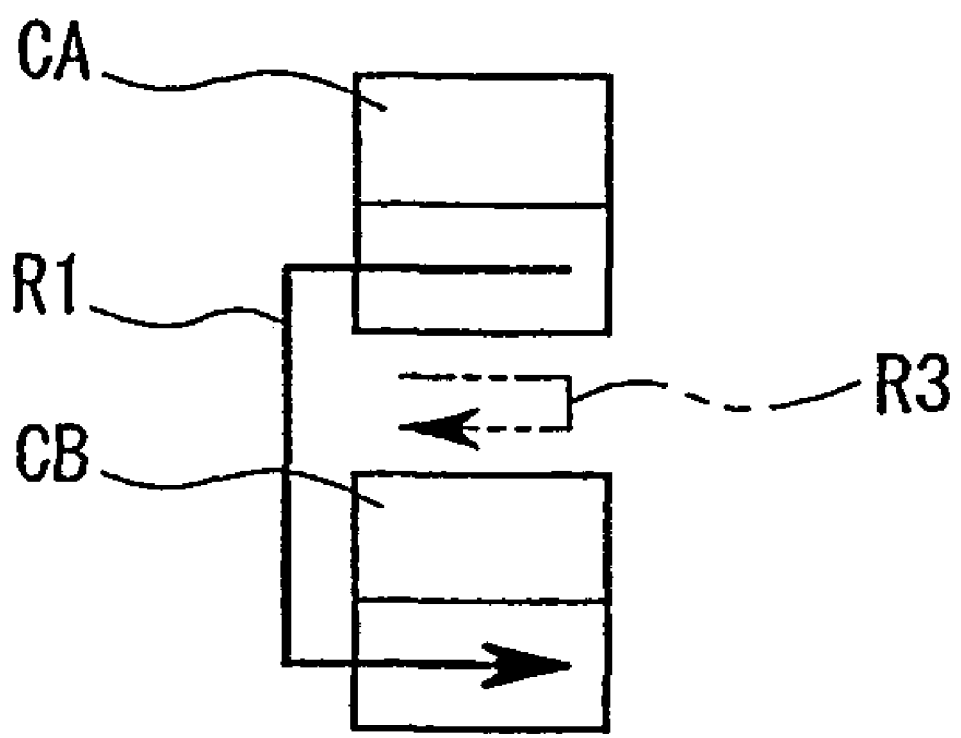
FIG. 27 is a diagram showing a further symbolized passage configuration.

FIG. 27 shows a passage configuration in which the oxidizing gas passage R1 extends in series from the cell CA side to the cell CB side and the coolant passage R3 extends in series along a U-shape between the cell CA side to the cell CB side. With this configuration, the same effects as those obtained by the passage configuration shown in FIG. 25 can be obtained.

Figure 28:
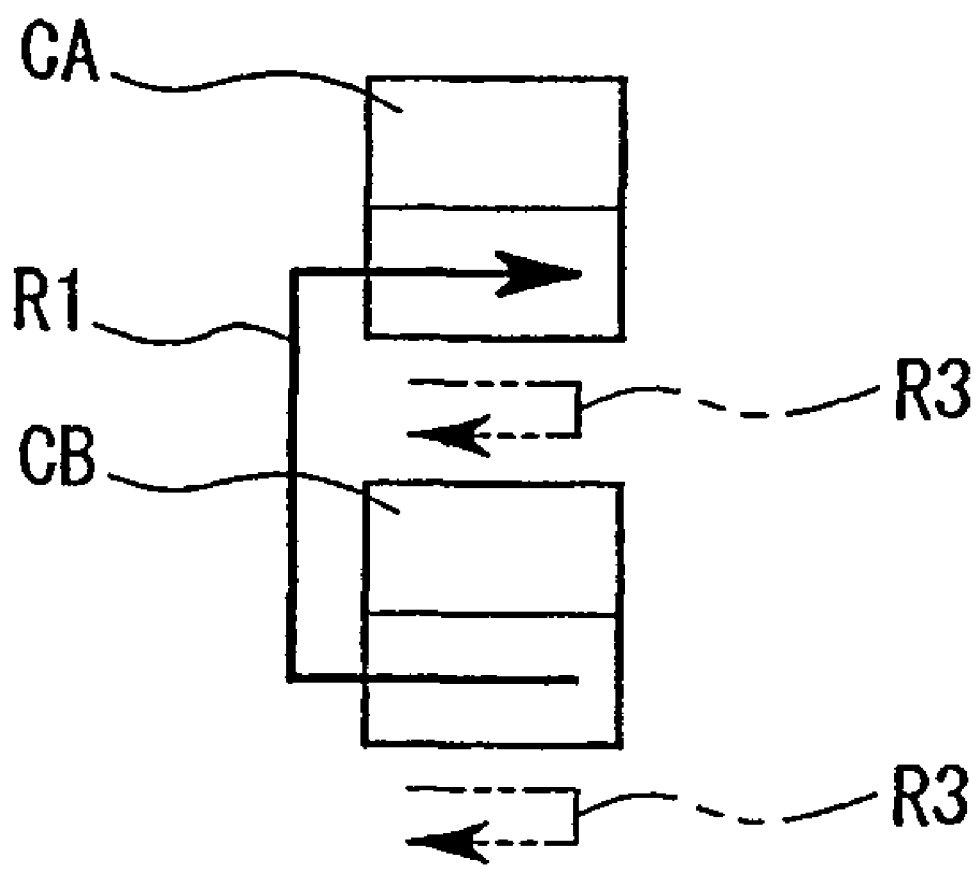
FIG. 28 is a diagram showing still a further symbolized passage configuration.

FIG. 28 shows a passage configuration in which the oxidizing gas passage R1 extends in a series along a U-shape from the cell CB side to the cell CA side, and the coolant passages R3 extend, between the cells CA and CB and outside the cell CB, along U-shapes opposite to the U-shape of the oxidizing gas passage R1. With this configuration, the same effects as those obtained by the passage configuration shown in FIG. 25 can be obtained.

Even in a three-cell structure, the flow directions of the oxidizing gas, fuel gas, and coolant can be variously changed, like the above-described two-cell structure.

Figure 29:
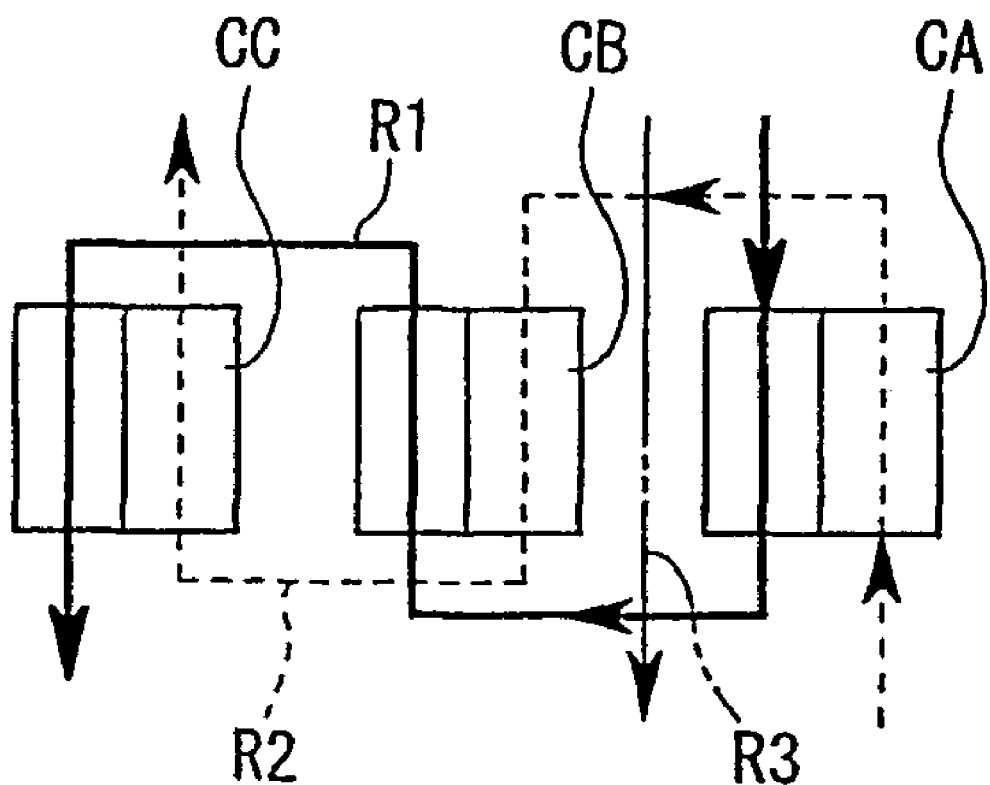
FIG. 29 is a diagram showing a typical passage configuration of a three-cell structure.

FIG. 29 shows a passage configuration of a three-cell structure having cells CA, CB and CC. In this passage configuration, the oxidizing gas passage R1 extends in series from the cell CA to the cell CC via the cell CB, and the fuel gas passage R2 extends, in the direction opposite to the flow direction of the oxidizing gas passage R1, in series from the cell CA to the cell CC via the cell CB. In addition, the coolant passage R3 is provided between the cells CA and CB.

In such a passage configuration, since the flow rate per unit cell of each of the oxidizing gas and fuel gas is increased, the flow velocity and pressure drop thereof are improved and partial pressures of steam in the cells CA, CB and CC are equalized. Further, since the oxidizing gas and fuel gas oppositely flow along the plane direction in the cells CA, CB and CC, water produced on the outlet side of the oxidizing gas passage R1 is reversely diffused in the fuel gas passage R2 via the electrolyte membrane, to effectively humidify the fuel gas, thereby improving the self-humidification characteristic.

Figure 30:
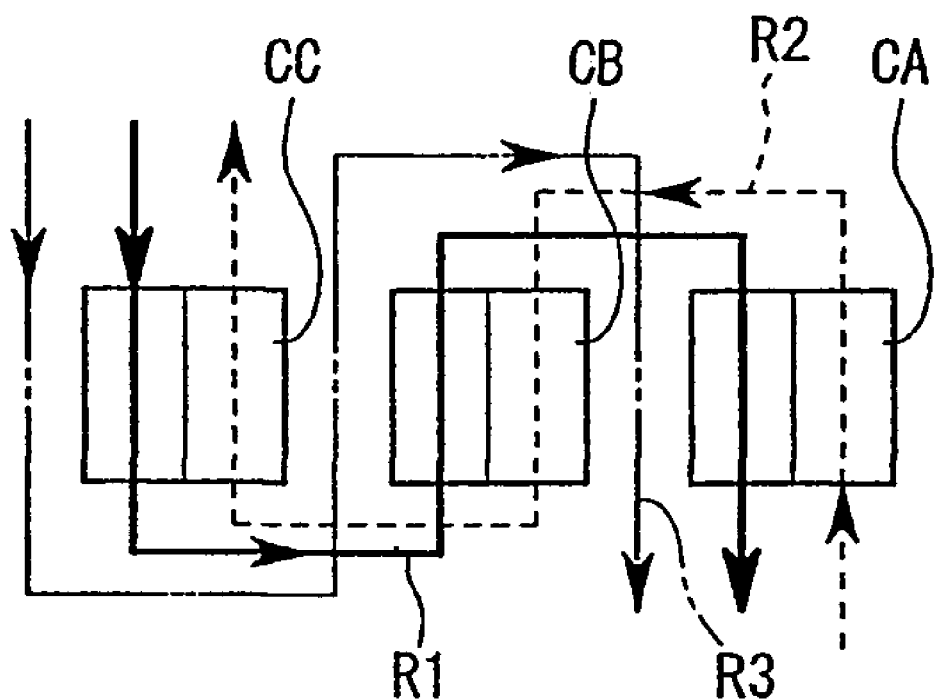
FIG. 30 is a diagram showing another passage configuration of the three-cell structure.

FIG. 30 shows a passage configuration of a three-cell structure, in which the oxidizing gas passage R1 extends in series from the cell CC to the cell CA via the cell CB and the fuel gas passage R2 extends in series from the cell CA to the cell CC via the cell CB; and the coolant passage R3 meanderingly extends in series from the cell CC to the cell CA via the cell CB.

Figure 31:
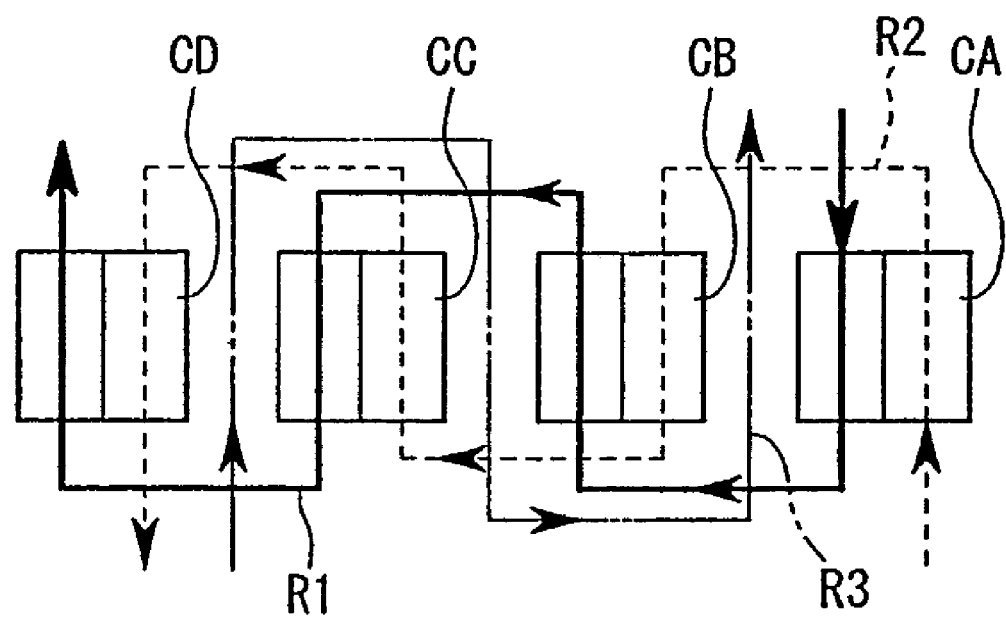
FIG. 31 is a diagram showing a typical passage configuration of a four-cell structure.

FIG. 31 shows a passage configuration of a four-cell structure having cells CA, CB, CC and CD. In this passage configuration, the oxidizing gas passage R1 extends in series in the order of the cells CA, CB, CC and CD and the fuel gas passage R2 extends, in the direction opposite to the flow direction of the oxidizing gas passage R1, in series in the order of the cells CA, CB, CC and CD; and the coolant passage R3 extends in the direction opposite to the flow direction of the oxidizing gas passage R1, in series between the cells CA and CB, between CB and CC, and between CC and CD.

With this configuration, since the flow rate per unit cell of each of the oxidizing gas and fuel gas is increased, the flow velocity and pressure drop thereof are improved and partial pressures of steam in the cells CA, CB, CC and CD are equalized.

Figure 32:
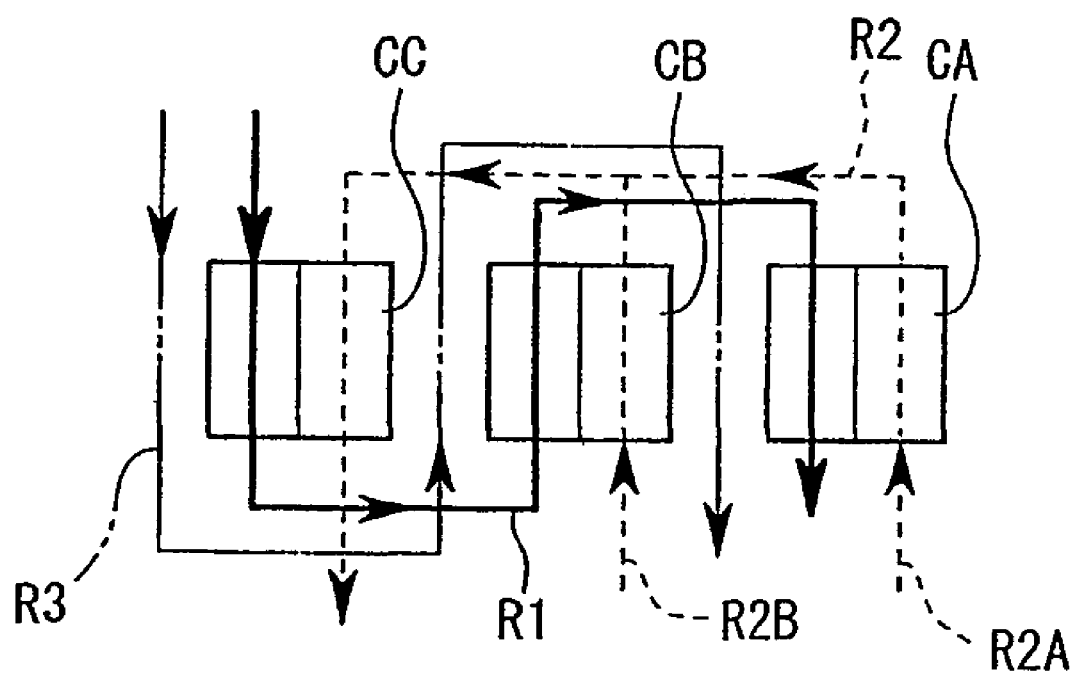
FIG. 32 is a diagram showing a passage configuration of a three-cell structure in which a fuel gas side has a merge configuration.

FIG. 32 shows a passage configuration of a three-cell structure in which the fuel gas side has a merge configuration. In this passage configuration, the oxidizing gas passage R1 extends in series in the order of the cell CC, CB and CA and the coolant passage R3 meanderingly extends in the same direction as that of the oxidizing gas passage R1; and a fuel gas passage R2A is provided in the cell CA in such a manner as to extend in the direction opposite to the oxidizing gas passage R1, a fuel gas passage R2B is provided in the cell CB in such a manner as to extend in parallel to the fuel gas passage R2A, and a fuel gas passage R2 into which the fuel gas passages R2A and R2B merge is provided in the cell CC in such a manner as to flow in the same direction as that of the oxidizing gas passage R1.

In this way, the fuel gas passages R2A and R2B are provided in parallel to each other, which passages R2A and R2B merge into the fuel gas passage R2. As a result, it is possible to effectively improve the hydrogen utilization ratio. It is to be noted that the same effects can be obtained by allowing the oxidizing gas side to have a merge configuration.

Figure 33:
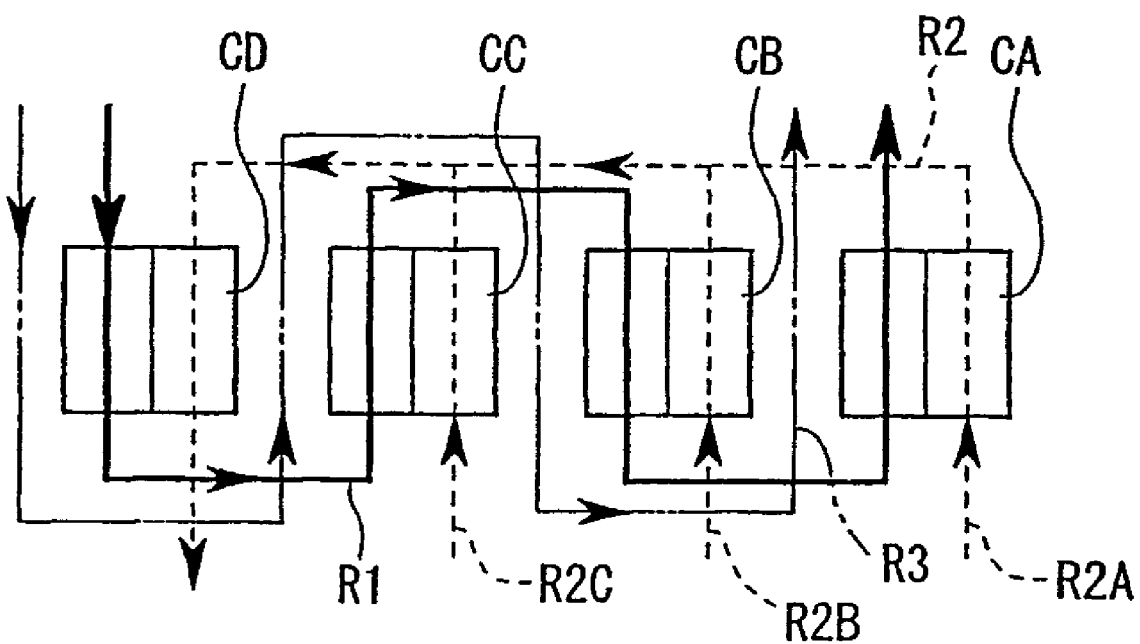
FIG. 33 is a diagram showing a passage configuration of a four-cell structure in which a fuel gas side has a merge configuration.

FIG. 33 shows a passage configuration of a four-cell structure in which the fuel gas side has a merge configuration. In this passage configuration, the oxidizing gas passage R1 extends in series in the order of the cells CD, CC, CB and CA and the coolant passage R3 extends in series in the same direction as that of the oxidizing gas passage R1; and a fuel gas passage R2A is provided in the cell CA, a fuel gas passage R2B is provided in the cell CB, a fuel gas passage R2C is provided in the cell CC, and a fuel gas passage R2 into which the fuel gas passages R2A, R2B and R2C merge is provided in the cell CD in such a manner as to extend in the same direction as that of the oxidizing gas passage R1.

With this configuration, the same effects as those obtained by the three-cell structure shown in FIG. 32 can be obtained. In particular, since a reduction in flow rate of the fuel gas due to consumption is large, the adoption of the merge configuration of the fuel gas side is effective to easily improve the flow velocity of the fuel gas and also easily enhance the hydrogen utilization ratio.

Figure 34:
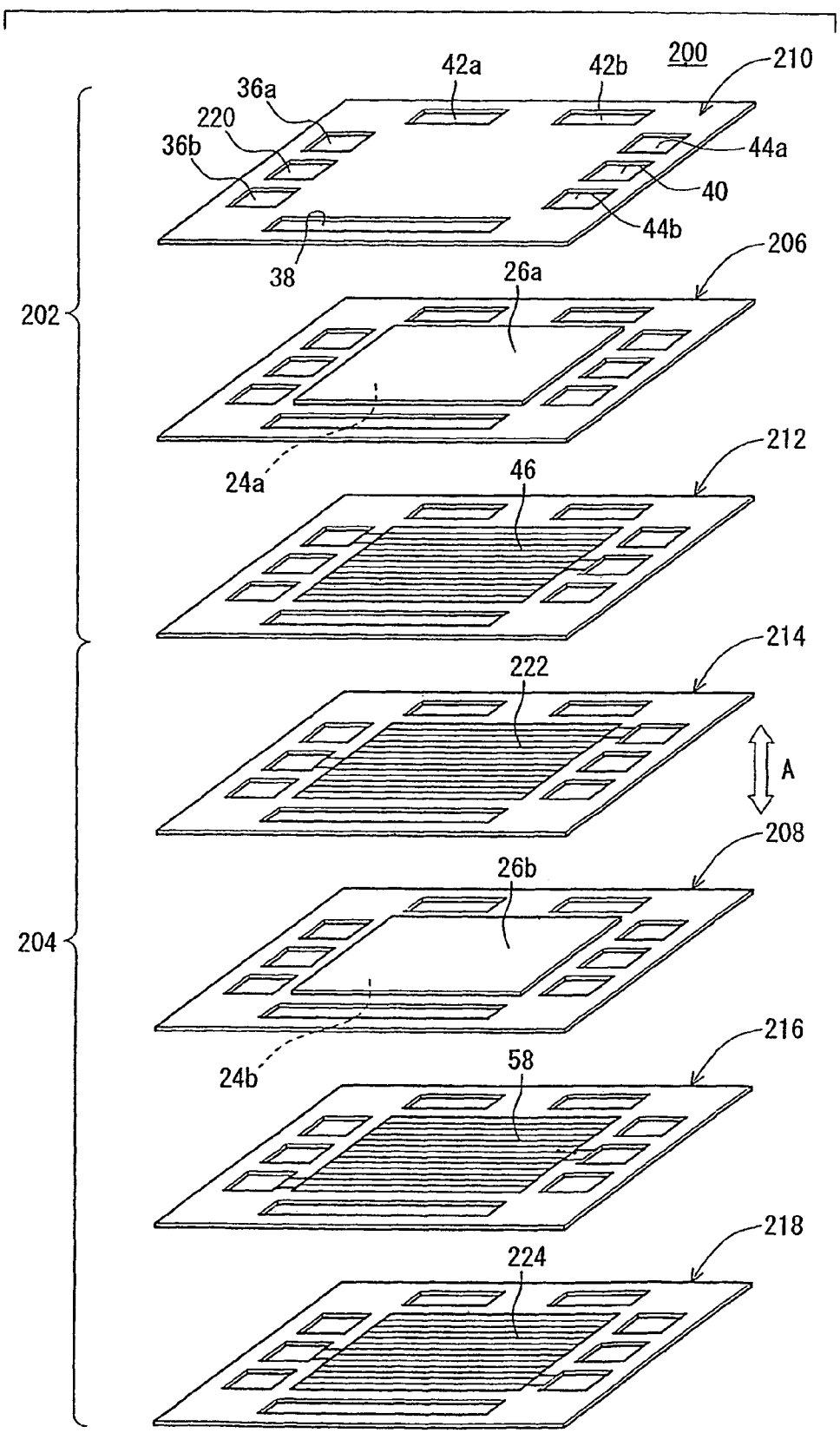
FIG. 34 is an exploded perspective view of an essential portion of a solid polymer electrolyte fuel cell assembly according to a sixth embodiment of the present invention.
Figure 35:
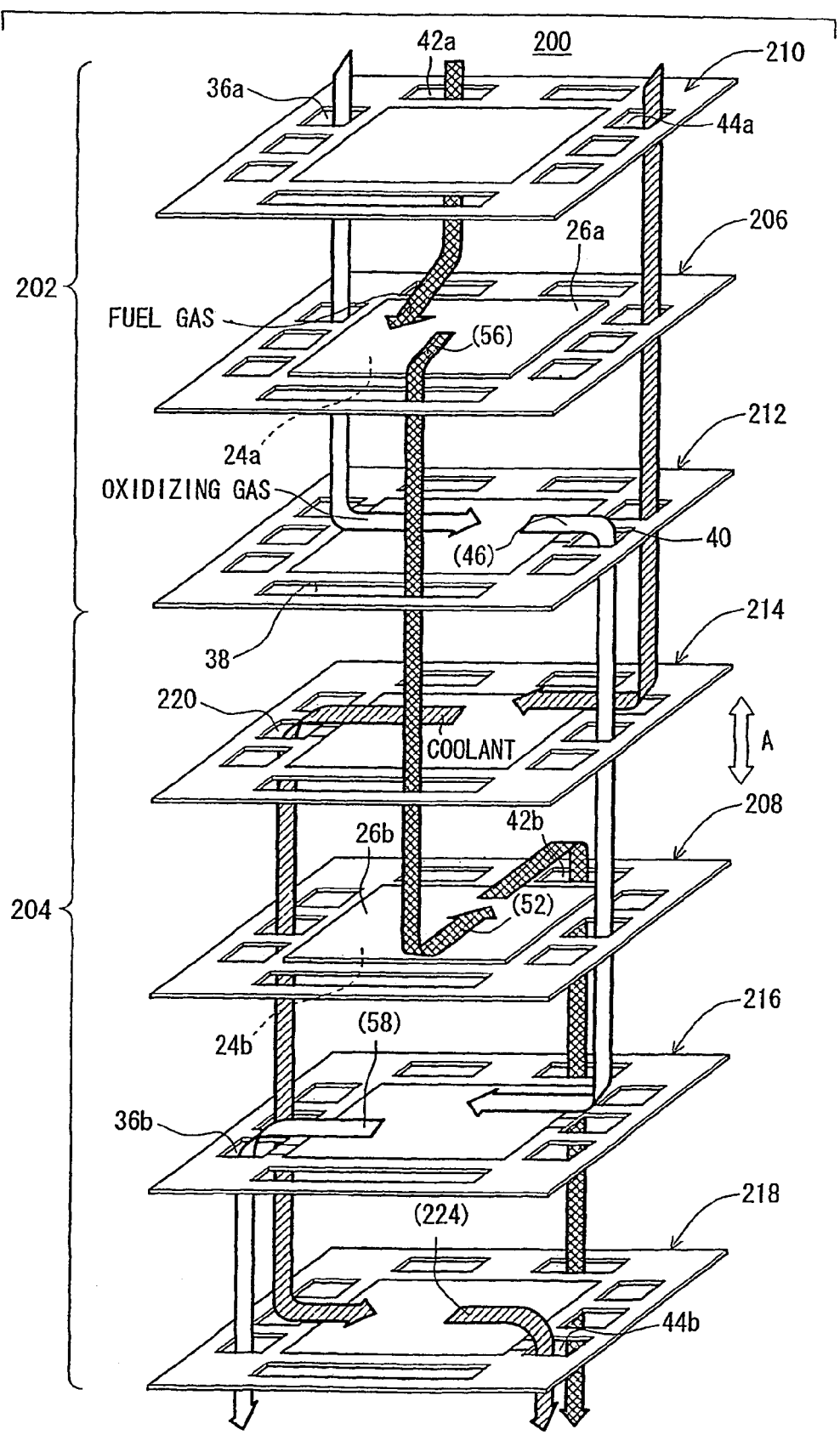
FIG. 35 is a view showing flows of reaction gases and a coolant in the cell assembly according to the sixth embodiment of the present invention.

FIG. 34 is an exploded perspective view of a solid polymer electrolyte fuel cell assembly 200 according to a sixth embodiment of the present invention, and FIG. 35 is a view showing flows of an oxidizing gas, a fuel gas, and a coolant in the cell assembly 200. In the cell assembly 200 according to this embodiment, parts corresponding to those in the cell assembly 10 according to the first embodiment are designated by the same reference numerals and the overlapped description thereof is omitted.

The cell assembly 200 includes a first unit cell 202 and a second unit cell 204 which are stacked to each other in the direction shown by an arrow A. The first unit cell 202 has a first unified body 206 and the second unit cell 204 has a second unified body 208. The first unified body 206 is held between a first separator 210 and a first intermediate separator 212, and the second unified body 208 is held between a second intermediate separator 214 and a second separator 216. A third separator 218 is stacked to the second separator 216.

The cell assembly 200 has, on a one-edge portion in the long-side direction, oxidizing gas inlets 36$a$, coolant intermediate communication holes 220, and oxidizing gas outlets 36$b$ which respectively pass through the cell assembly 200 in the direction shown by an arrow A, and also has, on the other edge portion in the long-side direction, coolant inlets 44$a$, oxidizing gas intermediate communication holes 40, and coolant outlets 44$b$ which respectively pass through the cell assembly 200 in the direction shown by the arrow A. The cell assembly 200 has, on a one-edge portion in the short-side direction, fuel gas inlets 42$a$ and fuel gas outlets 42$b$ which respectively pass through the cell assembly 200, and also has, on the other edge portion in the short-side direction, fuel gas intermediate communication holes 38 which pass through the cell assembly 200 in the direction shown by the arrow A.

The second intermediate separator 214 has a plurality of linear coolant passages 222 communicated to both the coolant inlet 44$a$ and the coolant intermediate communication hole 220 of the second intermediate separator 214. The third separator 218 has a plurality of linear coolant passages 224 communicated to both the coolant intermediate communication hole 220 and the coolant outlet 44$b$ of the third separator 218.

In the cell assembly 200 configured as described above, in each of the first and second unified bodies 206 and 208, the oxidizing gas and fuel gas are supplied in series in the directions perpendicular to each other, with a result that the same effects as those obtained by the first embodiment, such as equalization of humidities and improvement of the drainage characteristic can be obtained.

Figure 36:
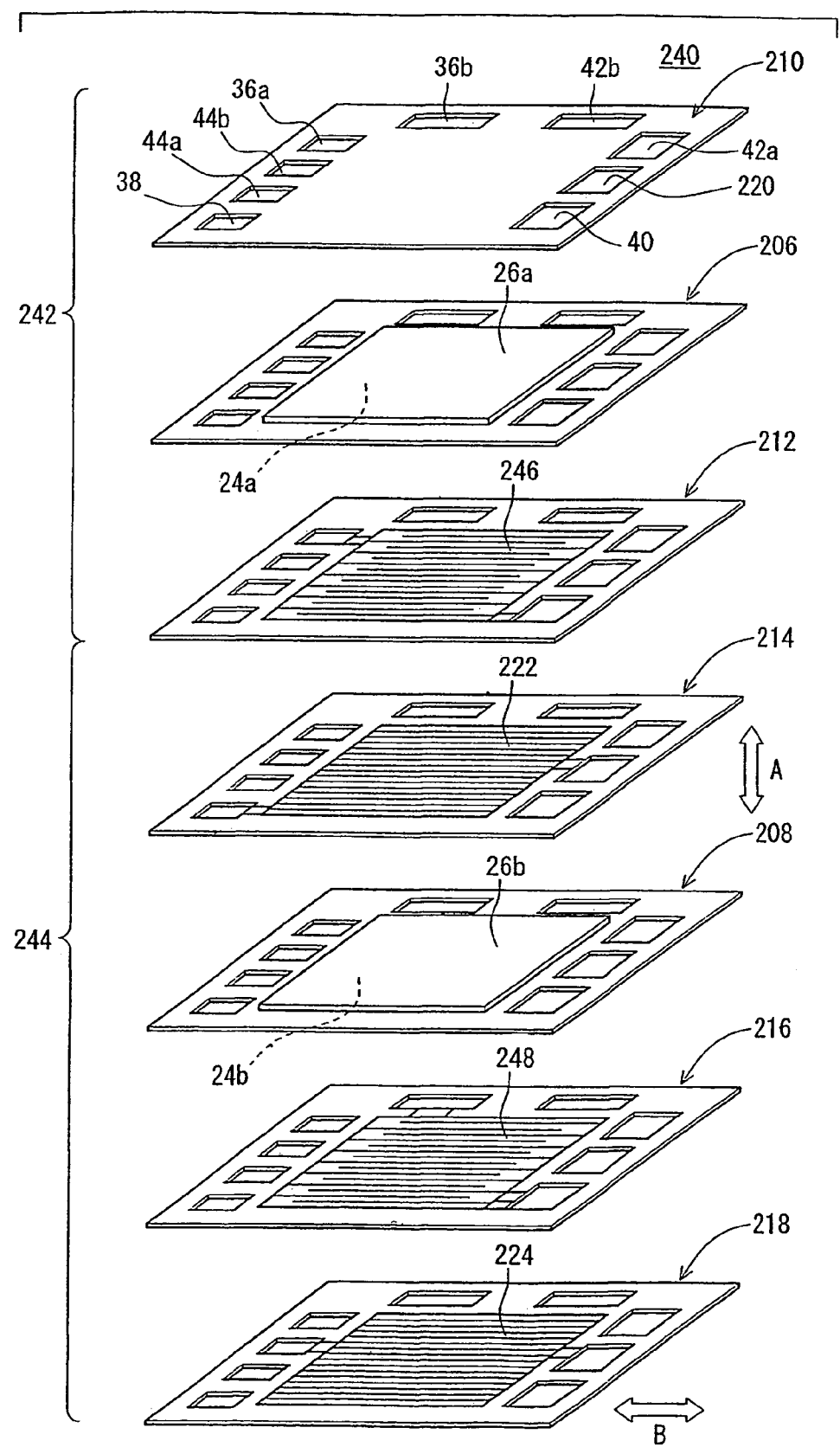
FIG. 36 is an exploded perspective view of an essential portion of a solid polymer electrolyte fuel cell assembly according to a seventh embodiment of the present invention.
Figure 37:
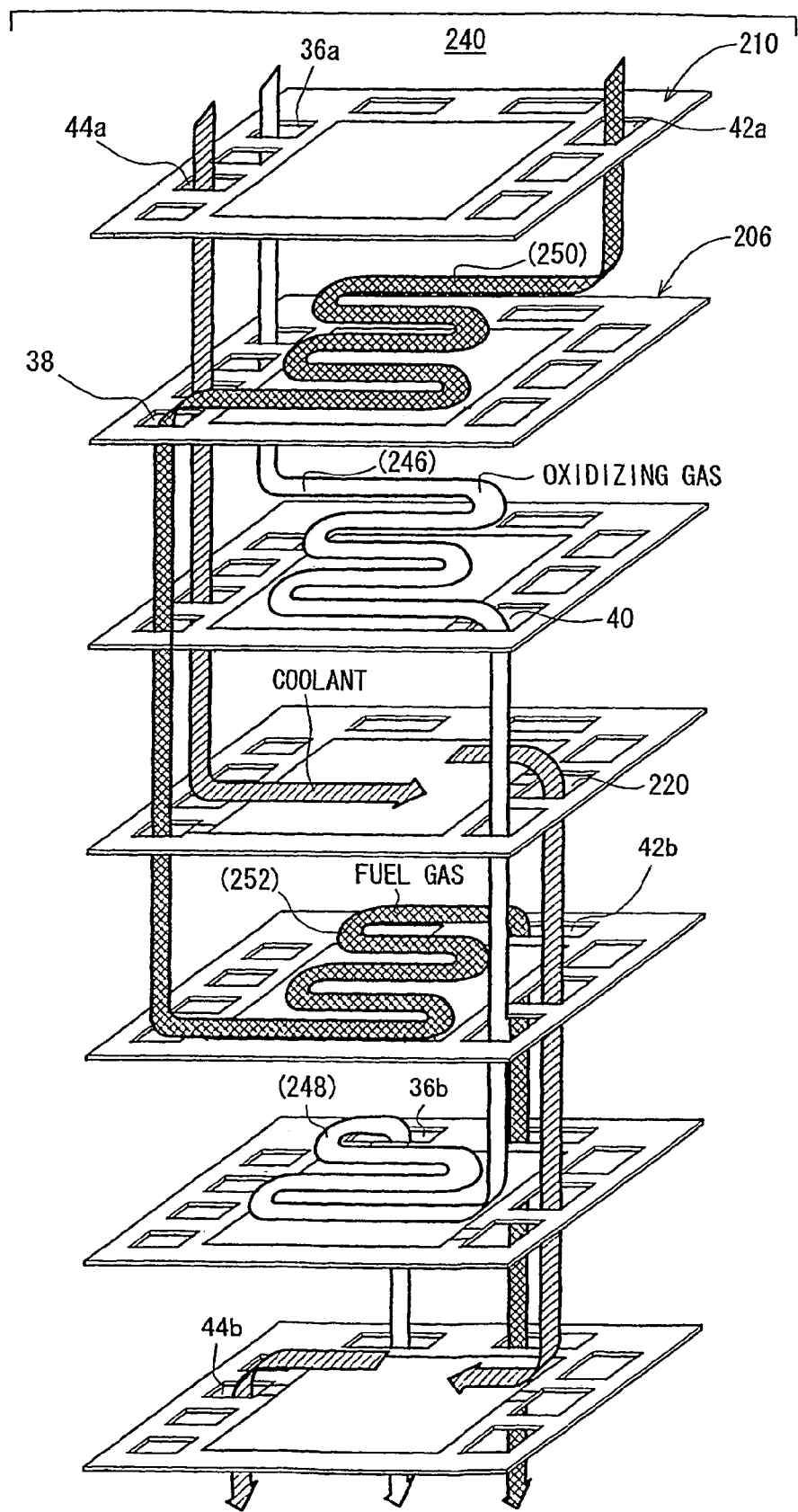
FIG. 37 is a view showing flows of reaction gases and a coolant in the cell assembly according to the seventh embodiment of the present invention.

FIG. 36 is an exploded perspective view of a solid polymer electrolyte fuel cell assembly 240 according to a seventh embodiment of the present invention, and FIG. 37 is a view showing flows of an oxidizing gas, a fuel gas, and a coolant in the cell assembly 240. In the cell assembly 240 according to this embodiment, parts corresponding to those in the cell assembly 200 according to the sixth embodiment shown in FIG. 34 are designated by the same reference numerals and the overlapped description thereof is omitted.

The cell assembly 240 includes a first unit cell 242 and a second unit cell 244 which are stacked in the direction shown by an arrow A. The cell assembly 240 has, on a one-edge portion in the long-side direction, oxidizing gas inlets 36$a$, coolant outlets 44$b$, coolant inlets 44$a$, and fuel gas intermediate communication holes 38 which respectively pass through the cell assembly 240 in the direction shown by the arrow A, and also has, on the other edge portion in the long-side direction, fuel gas inlets 42$a$, coolant intermediate communication holes 220, and oxidizing gas intermediate communication holes 40 which respectively pass through the cell assembly 240 in the direction shown by the arrow A. The cell assembly 240 has, on a one-edge portion in the short-side direction, oxidizing gas outlets 36$b$ and fuel gas outlets 42$b$ which respectively pass through the cell assembly 240 in the direction shown by the arrow A.

A first intermediate separator 212 has oxidizing gas passages 246 meandering along a surface facing to a cathode 24$a$ of a first unified body 206, and a second separator 216 has oxidizing gas passages 248 meandering along a surface facing to a cathode 24$b$ of a second unified body 208. The oxidizing gas passages 246 are communicated to both the oxidizing gas inlet 36$a$ and the oxidizing gas intermediate communication hole 40 of the first intermediate separator 212. The oxidizing gas passages 248 are communicated to both the oxidizing gas intermediate communication hole 40 and the oxidizing gas outlet 36$b$ of the second separator 216.

As shown in FIG. 37, a first separator 210 has fuel gas passages 250 meandering along a surface facing to an anode 26$a$ of the first unified body 206, and a second intermediate separator 214 has fuel gas passages 252 meandering along a surface facing to an anode 26$b$ of the second unified body 208. The fuel gas passages 250 are communicated to both the fuel gas inlet 42$a$ and the fuel gas intermediate communication hole 38 of the first separator 210, and the fuel gas passages 252 are communicated to both the fuel gas intermediate communication hole 38 and the fuel gas outlet 42$b$ of the second intermediate separator 214.

In the cell assembly 246 configured as described above, the oxidizing gas supplied to the cell assembly 240 flows along the meandering, oxidizing gas passages 246 and 248 communicated in series to each other, and the fuel gas supplied to the cell assembly 240 flows in the meandering gas passages 250 and 252 communicated in series to each other. Accordingly, the length of the gas passages for each of the oxidizing gas and fuel gas is made relatively greater, with a result that the same effects as those obtained by the first embodiment, such as equalization of humidities and improvement in drainage characteristic can be obtained.

Although certain preferred embodiments of the present invention have been shown and, described in detail, it should be understood that various changes and modifications may be made therein without departing from the scope of the appended claims.

In the solid polymer electrolyte fuel cell assembly and the fuel cell stack according to the present invention, the cell assembly is configured by stacking a plurality of unit cells to each other and the reaction gas passages are provided such that at least portions thereof are communicated in series to each other over respective unit cells, and accordingly, it is possible to easily equalize humidities and easily improve the drainage characteristic, and further, since the fuel cell stack is assembled by stacking the cell assembles to each other, it is possible to effectively improve the workability of the assembly of the fuel cell stack.

In the method of supplying a reaction gas to a fuel cell according to the present invention, the reaction gas is supplied in series to a plurality of unit cells constituting each cell assembly, and accordingly, it is possible to increase the flow rate, flow velocity, and pressure drop of the reaction gas, and hence to effectively improve the reaction performance of each unit cell.

The invention claimed is:

1. A solid polymer electrolyte fuel cell assembly, comprising a plurality of unit cells stacked to each other, said unit cells each having a unified body including an anode, a cathode, and a solid polymer electrolyte membrane disposed between said anode and said cathode, wherein reaction gas passages for allowing a reaction gas including at least one of a fuel gas and an oxidizing gas to flow in said unit cells are provided in said fuel cell assembly in such a manner that at least portions of said reaction gas passages communicate in series with each other over said unit cells, wherein fuel gas passages of said reaction gas passages are provided in series in said plurality of unit cells; and wherein oxidizing gas passages of said reaction gas passages are provided in parallel in said plurality of unit cells.

2. A solid polymer electrolyte fuel cell assembly according to claim 1, wherein at least two of said unit cells in said fuel cell assembly have structures different from each other.

3. A solid polymer electrolyte fuel cell assembly according to claim 2, wherein said reaction gas passages are provided in at least two of said unit cells and have cross-sections different from each other.

4. A solid polymer electrolyte fuel cell assembly according to claim 3, wherein the cross-sections of said reaction gas passages provided in said at least two unit cells are different from each other by making the depths, widths, or the number of reaction gas passages provided in one of said at least two unit cells different, respectively, from the depths, widths, or the number of reaction gas passages provided in another of said at least two unit cells.

5. A solid polymer electrolyte fuel cell assembly according to claim 3, wherein said cross-sections of said reaction gas passages on a downstream side in a flow direction of the reaction gas are smaller than said cross-sections of said reaction gas passages on an upstream side in the flow direction of the reaction gas.

6. A solid polymer electrolyte fuel cell assembly according to claim 2, wherein a length of said reaction gas passages on a downstream side in a flow direction of the reaction gas is greater than a length of said reaction gas passages on an upstream side in the flow direction of the reaction gas.

7. A solid polymer electrolyte fuel cell assembly according to claim 2, wherein said reaction gas passages provided in said at least two unit cells have shapes different from each other.

8. A solid polymer electrolyte fuel cell assembly according to claim 2, wherein said unified bodies provided in said at least two unit cells are different from each other.

9. A solid polymer electrolyte fuel cell assembly according to claim 8, wherein a heat resistance of said unified body on a downstream side in a flow direction of the reaction gas is higher than a heat resistance of said unified body on an upstream side in the flow direction of the reaction gas.

10. A solid polymer electrolyte fuel cell assembly according to claim 9, wherein said unified body on the upstream side in the flow direction of the reaction gas is provided with a fluorine based membrane; and said unified body on the downstream side in the flow direction of the reaction gas is provided with a hydrocarbon based membrane.

11. A solid polymer electrolyte fuel cell assembly according to claim 1, wherein a separator is interposed between adjacent two of said unified bodies, and said separator has a reaction gas supply communication hole for supplying the reaction gas into said reaction gas passages provided in each of said unit cells, and a reaction gas discharge communication hole for discharging the reaction gas from said reaction gas passages is provided in each of said unit cells.

12. A solid polymer electrolyte fuel cell assembly according to claim 1, wherein a separator is interposed between adjacent two of said unified bodies, and said separator is configured as a metal plate having projections and depressions corresponding to shapes of said reaction gas passages.

13. A solid polymer electrolyte fuel cell assembly according to claim 12, wherein said separator has fuel gas passages as said reaction gas passages on a side facing one of said unified bodies, and has oxidizing gas passages as said reaction gas passages on a side facing the other of said unified bodies.

14. A solid polymer electrolyte fuel cell assembly according to claim 1, wherein said reaction gas passages are configured such that the reaction gas passes along a reaction plane of one of the adjacent two of said unit cells flows in a stacking direction of said unit cells, and flows on a reaction plane of the other of the adjacent two of said unit cells.

15. A solid polymer electrolyte fuel cell assembly according to claim 14, wherein said reaction gas passages meanderingly extend in the stacking direction of said unit cells.

16. A solid polymer electrolyte fuel cell assembly according to claim 14, wherein a flow direction of said fuel gas in fuel gas passages of said reaction gas passages along the reaction plane of said unit cell is opposite to a flow direction of said oxidizing gas in oxidizing gas passages of said reaction gas passages along the reaction plane of said unit cell.

17. A solid polymer electrolyte fuel cell assembly according to claim 1, wherein fuel gas passages and oxidizing gas passages of said reaction gas passages are provided in such a maimer as to linearly extend along the reaction plane of said unit cell.

18. A solid polymer electrolyte fuel cell assembly according to claim 17, wherein said fuel gas passages or said oxidizing gas passages of said reaction gas passages are provided with a reaction gas inlet and a reaction gas outlet on one side of a plane of said unit cell.

19. A solid polymer electrolyte fuel cell assembly according to claim 14, wherein an intermediate communication hole which communicates with said reaction gas passages is provided for each of said unit cells in such a manner as to extend in the stacking direction of said unit cells; and said reaction gas passages form an approximately U-shaped flow line extending from one reaction gas inlet of one of said unit cells to a reaction gas outlet of the other of said unit cells through said intermediate communication hole.

20. A solid polymer electrolyte fuel cell assembly according to claim 1, further comprising coolant passages located on both sides of said unit cells in a stacking direction of said unit cells.

21. A solid polymer electrolyte fuel cell assembly according to claim 20, wherein said coolant passages are closer to an oxidizing gas passage provided in said unit cell on an upstream side in a flow direction of the oxidizing gas relative to an oxidizing gas passage provided in said unit cell on a downstream side in the flow direction of the oxidizing gas.

22. A solid polymer electrolyte fuel cell assembly according to claim 20, wherein coolant inlets and coolant outlets which communicate with said coolant passages are provided on one side of said unit cells.

23. A solid polymer electrolyte fuel cell assembly according to claim 22, wherein said coolant passages form an approximately U-shaped flow path for allowing a coolant to flow from said coolant inlet to one side of a partition wall member, flow along the one side of said partition wall member, flow to the other side of said partition wall member via an intermediate return portion, and flow in the opposite direction along the other side of said partition wall member.

24. A solid polymer electrolyte fuel cell assembly according to claim 23, wherein said coolant passage linearly extends along a plane of said unit cell.

25. A solid polymer electrolyte fuel cell assembly according to claim 20,
wherein said coolant passages communicate with each other in series.

26. A fuel cell stack, comprising a stack of a plurality of cell assemblies,
wherein each of said cell assemblies comprises a plurality of unit cells stacked to each other, said unit cells each having a unified body including an anode, a cathode, and a solid polymer electrolyte membrane between said anode and said cathode;
wherein reaction gas passages for allowing a reaction gas including at least one of a fuel gas and an oxidizing gas to flow in said unit cells are provided in said cell assembly in such a manner that at least portions of said reaction gas passages communicate in series with each other over said unit cells;
wherein fuel gas passages of said reaction gas passages are provided in series in said plurality of unit cells; and
wherein oxidizing gas passages of said reaction gas passages are provided in parallel in said plurality of unit cells.

27. A fuel cell stack according to claim 26, wherein at least two of said unit cells in said cell assembly have structures different from each other.

28. A fuel cell stack according to claim 26, wherein a coolant passage is provided only between adjacent two of said cell assemblies.

29. A fuel cell stack according to claim 26, further comprising a reaction gas supply communication hole and a reaction gas discharge communication hole, which are opened in a stacking direction of said fuel cell stack; and
intermediate communication holes opened in the stacking direction of said fuel cell stack in a flow line between said reaction gas supply communication hole and said reaction gas discharge communication hole.

30. A fuel cell stack according to claim 29, wherein each of said intermediate communication holes is provided in a flow line between a reaction gas inlet provided in a plane of one of adjacent two of said unit cells and a reaction gas outlet provided in a plane of the other of the adjacent two of said unit cells.

31. A fuel cell stack according to claim 29, wherein said intermediate communication hole is configured for communicating with each other adjacent two of said unit cells provided in adjacent two of said cell assemblies.

32. A fuel cell stack according to claim 29, wherein said intermediate communication hole is configured for communicating with each other adjacent two of said unit cells only in one of said cell assemblies.

33. A fuel cell stack according to claim 26,
wherein coolant passages which communicate with each other in series are formed on both sides of said unit cells in a stacking direction of said unit cells.

34. A method of supplying a reaction gas to a solid polymer electrolyte fuel cell assembly having a plurality of unit cells stacked to each other, said unit cells each having a unified body including an anode, a cathode, and a solid polymer electrolyte membrane between said anode and said cathode, wherein reaction gas passages for allowing a reaction gas to flow in said unit cells are provided in said cell assembly in such a manner that at least portions of said reaction gas passages communicate in series with each other over said unit cells, wherein said reaction gas is an oxidizing gas,
said method comprising the steps of:
supplying the reaction gas through a reaction gas supply communication hole to a plurality of reaction gas passages in said unit cells in parallel, to subject the reaction gas flowing in said reaction gas passages to a cell reaction;
discharging spent reaction gas through reaction gas discharge communication holes;
introducing the reaction gas in said unit cell on an upstream side in a flow direction of the reaction gas so as to be used for the cell reaction, and then introducing the reactant gas, via an intermediate communication hole disposed in said unit cell on a downstream side in the flow direction of the reaction gas, so as to be used for the cell reaction; and
supplying a coolant in coolant passages which are disposed closer to an oxidizing gas passage provided in said unit cell on the upstream side in the flow direction of the oxidizing gas relative to an oxidizing gas passage provided in said unit cell on the downstream side in the flow direction of the oxidizing gas.

35. A method of supplying a reaction gas according to claim 34, further comprising the step of introducing the reaction gas in an amount required for reaction in the whole of said cell assembly in said unit cell on the most upstream side in a flow direction of the reaction gas.

36. A solid polymer electrolyte fuel cell assembly, comprising a plurality of unit cells stacked to each other, said unit cells each having a unified body including an anode, a cathode, and a solid polymer electrolyte membrane disposed between said anode and said cathode, the solid polymer electrolyte fuel cell assembly comprising:
comprising coolant passages located on both sides of said unit cells in a stacking direction of said unit cells;
wherein reaction gas passages for allowing a reaction gas including at least one of reaction gases of a fuel gas and an oxidizing gas to flow in said unit cells are provided in said fuel cell assembly in such a maimer that at least portions of said reaction gas passages communicate in series with each other over said unit cells; and
wherein said coolant passages are closer to an oxidizing gas passage provided in said unit cell on an upstream side in a flow direction of the oxidizing gas relative to an oxidizing gas passage provided in said unit cell on a downstream side in the flow direction of the oxidizing gas.

* * * * *